United States Patent
Lewit et al.

(10) Patent No.: US 6,206,669 B1
(45) Date of Patent: Mar. 27, 2001

(54) SYSTEM FOR CONTINUOUSLY MANUFACTURING A COMPOSITE PREFORM

(75) Inventors: Scott M. Lewit, Malabar; Miles Mackaness, Merritt Island, both of FL (US)

(73) Assignee: Compsys, Inc., Melbourne, FL (US)

( * ) Notice: Subject to any disclaimer, the term of this patent is extended or adjusted under 35 U.S.C. 154(b) by 0 days.

(21) Appl. No.: 09/172,341

(22) Filed: Oct. 14, 1998

Related U.S. Application Data

(60) Division of application No. 08/794,001, filed on Feb. 3, 1997, now Pat. No. 5,897,818, which is a continuation-in-part of application No. 08/577,800, filed on Dec. 21, 1995, now Pat. No. 5,664,518, which is a continuation-in-part of application No. 08/345,899, filed on Nov. 28, 1994, now abandoned, which is a continuation-in-part of application No. 08/181,321, filed on Jan. 14, 1994, now Pat. No. 5,429,066.

(51) Int. Cl.[7] .................................................. B29C 44/06
(52) U.S. Cl. ......................... 425/4 C; 425/115; 425/114; 425/817 C
(58) Field of Search ................... 425/4 C, 113, 425/114, 115, 145, 817 C, 308

(56) References Cited

U.S. PATENT DOCUMENTS

| | | | |
|---|---|---|---|
| 2,617,126 | 11/1952 | Nebesar | 156/196 |
| 2,648,619 | 8/1953 | Alderfer | 264/258 |
| 2,866,730 | 12/1958 | Potchen et al. | 425/371 |
| 3,240,845 | 3/1966 | Voelker | 264/46.5 |
| 3,389,195 | 6/1968 | Gianakos et al. | 101/233 |
| 3,435,470 | 4/1969 | Krenzler | 156/79 |
| 3,567,565 | 3/1971 | Jones et al. | 428/102 |
| 3,585,678 | 6/1971 | Neumann et al. | 425/4 R |
| 3,607,600 | 9/1971 | Schreter et al. | 264/213 |
| 3,681,485 | 8/1972 | Lieberman | 264/46.3 |
| 3,773,876 | 11/1973 | Rath et al. | 425/4 C |
| 3,792,141 | 2/1974 | Offutt | 264/46.3 |
| 3,835,720 | 9/1974 | Fisher et al. | 474/250 |
| 3,837,774 | * 9/1974 | Ross et al. | 425/817 C |
| 3,840,926 | 10/1974 | Stoberl | 114/357 |
| 3,848,284 | 11/1974 | Livingston | 114/357 |
| 3,867,494 | * 2/1975 | Rood et al. | 425/4 C |
| 3,873,654 | 3/1975 | Smith | 264/258 |
| 3,895,086 | 7/1975 | Berner | 264/45.4 |
| 3,989,781 | 11/1976 | Chant | 264/46.4 |
| 4,065,150 | 12/1977 | Van Auken | 264/257 |
| 4,065,820 | 1/1978 | Starratt, Jr. | 114/357 |
| 4,099,280 | 7/1978 | Hoppe et al. | 264/101 |
| 4,128,369 | 12/1978 | Kemerer et al. | 425/817 C |
| 4,171,193 | 10/1979 | Rahlfs | 425/145 |
| 4,205,408 | 6/1980 | Glass et al. | 264/137 |
| 4,263,247 | 4/1981 | Berger et al. | 264/273 |
| 4,268,571 | 5/1981 | McCarthy | 264/226 |
| 4,323,406 | 4/1982 | Morello | 264/245 |

(List continued on next page.)

FOREIGN PATENT DOCUMENTS

723816 * 7/1996 (EP).

Primary Examiner—Harold Pyon
Assistant Examiner—Thukhanh T. Nguyen
(74) Attorney, Agent, or Firm—Akerman Senterfitt

(57) ABSTRACT

A continuous composite structure manufacturing apparatus which comprises a conveyor or conveyors for conveying one or more fabric webs along a conveying path. Each of the webs is comprised of a reinforcing fabric, a non-woven fabric, or a layered fabric. The fabric web is passed through the conveyor so that it defines an enclosed foam injection zone. A foam injection system is provided for injecting foam into the foam injection zone to form a foam core preform (or a plurality of same). One or more dies are positioned along the conveying path, to shape each of the foam core preform (s) to a desired cross-sectional profile. The individual stringers or multiple, spaced apart, stringers are produced concurrently in a continuous production process.

32 Claims, 15 Drawing Sheets

U.S. PATENT DOCUMENTS

| | | | |
|---|---|---|---|
| 4,330,494 | 5/1982 | Iwata et al. | 264/46.2 |
| 4,372,900 | 2/1983 | Doerfling | 264/45.3 |
| 4,412,687 | 11/1983 | Andre | 428/117 |
| 4,422,998 | 12/1983 | Kornylak | 264/335 |
| 4,471,020 | 9/1984 | McCarthy | 264/255 |
| 4,510,200 | 4/1985 | Samowich | 156/307.5 |
| 4,511,523 | 4/1985 | Hsu | 264/46.6 |
| 4,568,603 | 2/1986 | Oldham | 428/195 |
| 4,581,186 | 4/1986 | Larson | 425/817 C |
| 4,613,471 | 9/1986 | Harris | 425/145 |
| 4,614,013 | 9/1986 | Stevenson | 264/46.7 |
| 4,681,798 | 7/1987 | Gill et al. | 428/215 |
| 4,695,501 | 9/1987 | Robinson | 428/159 |
| 4,755,250 | 7/1988 | Adolf | 156/268 |
| 4,764,238 | 8/1988 | Dastin et al. | 264/321 |
| 4,800,114 | 1/1989 | Cichanowski | 428/175 |
| 4,801,496 | 1/1989 | Buchacher | 156/279 |
| 4,804,425 | 2/1989 | Hoffmann et al. | 156/73.6 |
| 4,812,194 | 3/1989 | Pelz | 264/135 |
| 4,851,283 | 7/1989 | Holtrop et la. | 428/340 |
| 4,867,826 | 9/1989 | Wayte | 156/219 |
| 4,877,476 | 10/1989 | Wolf | 156/307.3 |
| 4,891,176 | 1/1990 | Drysdale et al. | 264/250 |
| 4,942,075 | 7/1990 | Hartel et al. | 428/109 |
| 4,954,377 | 9/1990 | Fischer et al. | 428/36.1 |
| 4,988,469 | 1/1991 | Reavely et al. | 264/113 |
| 4,995,675 | 2/1991 | Tsai | 301/64.7 |
| 5,061,542 | 10/1991 | Brace | 156/227 |
| 5,068,001 | 11/1991 | Haussling | 156/222 |
| 5,087,491 | 2/1992 | Barrett | 428/34.5 |
| 5,098,346 | 3/1992 | Redmond | 474/161 |
| 5,152,949 | 10/1992 | Leoni et al. | 264/257 |
| 5,173,227 | 12/1992 | Ewen et al. | 264/258 |
| 5,194,190 | 3/1993 | Kim | 264/258 |
| 5,227,227 | 7/1993 | Boulanger | 442/409 |
| 5,230,844 | 7/1993 | Macaire et al. | 264/46.7 |
| 5,250,132 | 10/1993 | Lapp et al. | 156/173 |
| 5,258,585 | 11/1993 | Juriga | 428/316.6 |
| 5,264,167 | 11/1993 | Proksa et al. | 264/46.2 |
| 5,304,339 | 4/1994 | Le Comte | 264/258 |
| 5,308,675 | 5/1994 | Crane et al. | 428/120 |
| 5,364,061 | 11/1994 | Ciolczyk et al. | 248/610 |
| 5,413,661 | 5/1995 | Spengler et al. | 264/258 |
| 5,433,165 | 7/1995 | McGuiness et al. | 264/225 |
| 5,446,250 | 8/1995 | Oka | 428/136 |
| 5,601,049 | 2/1997 | Hordis et al. | 264/258 |
| 5,658,599 | 8/1997 | Daws | 425/123 |
| 5,664,518 | 9/1997 | Lewit et al. | 264/258 |
| 5,733,494 | 3/1998 | Moore | 264/258 |

\* cited by examiner

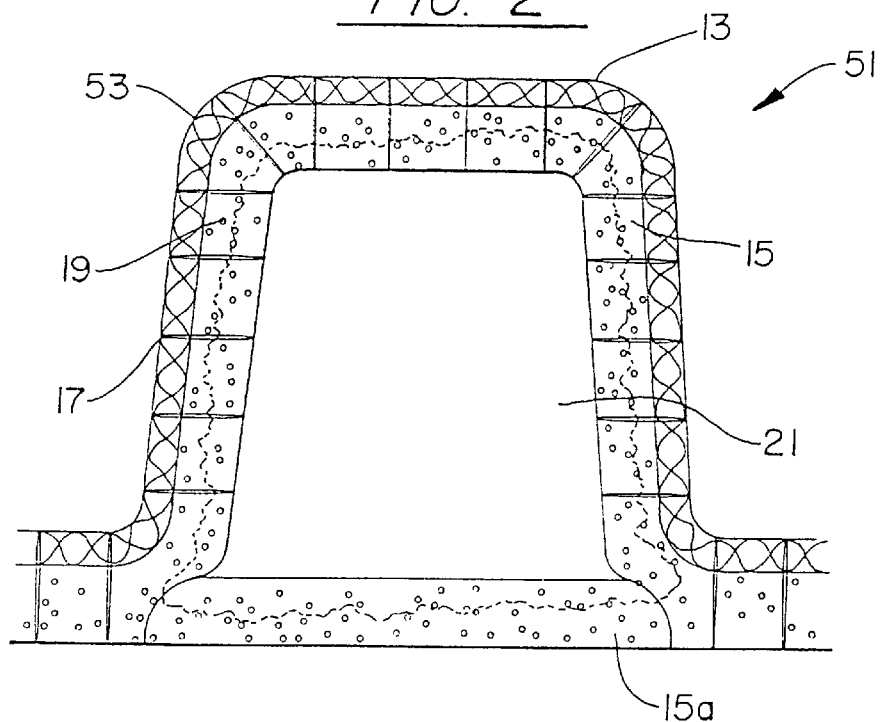
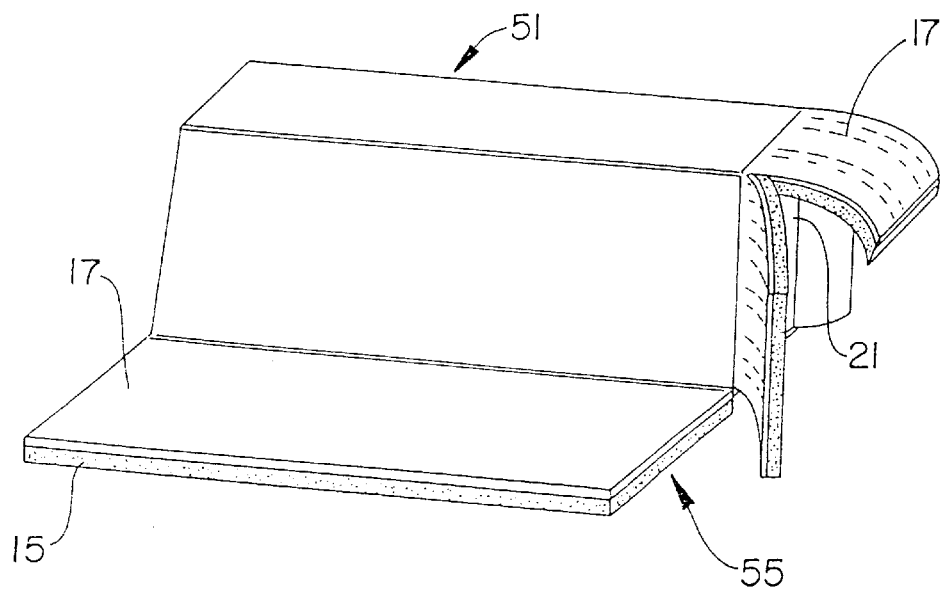

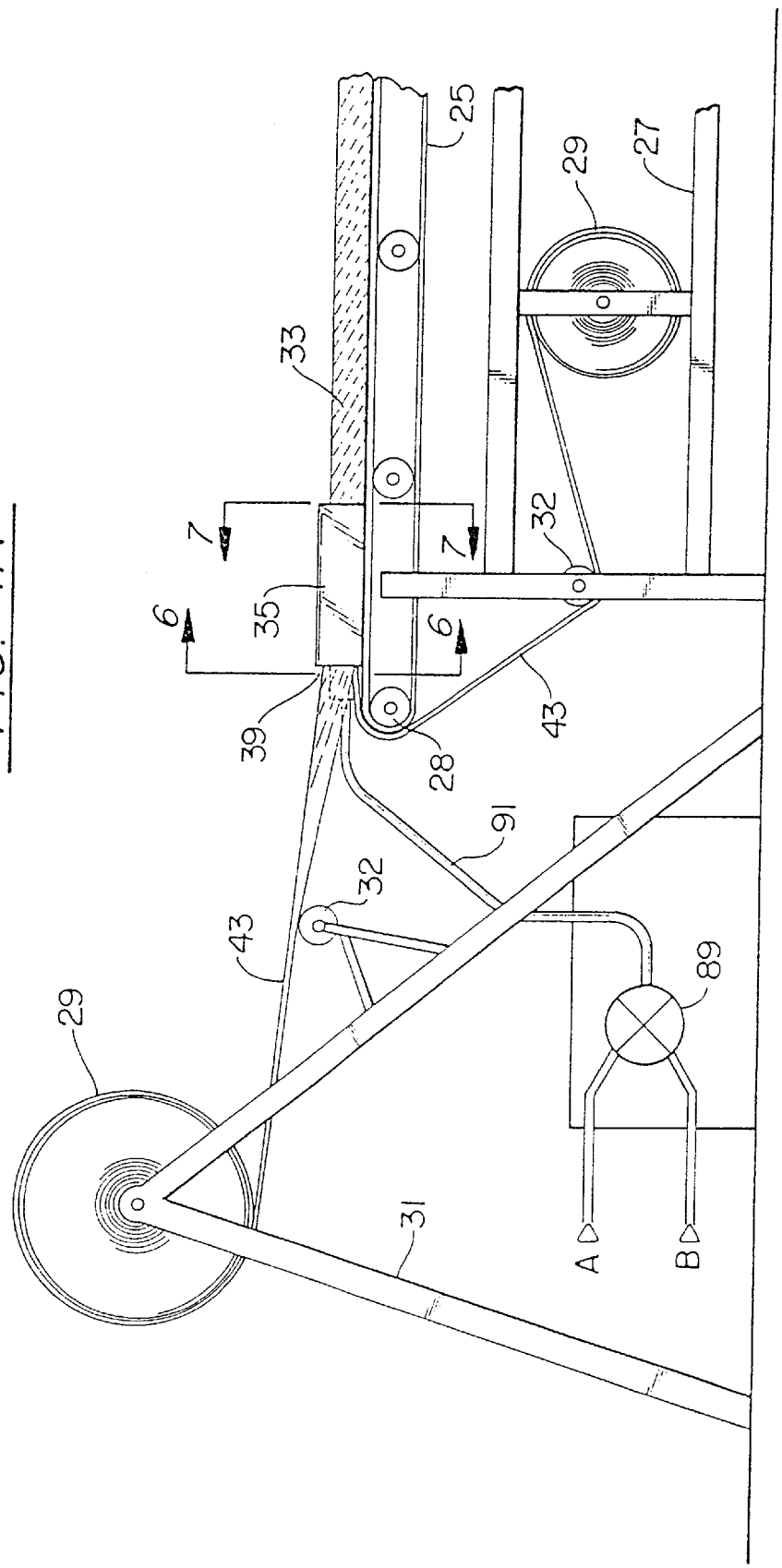

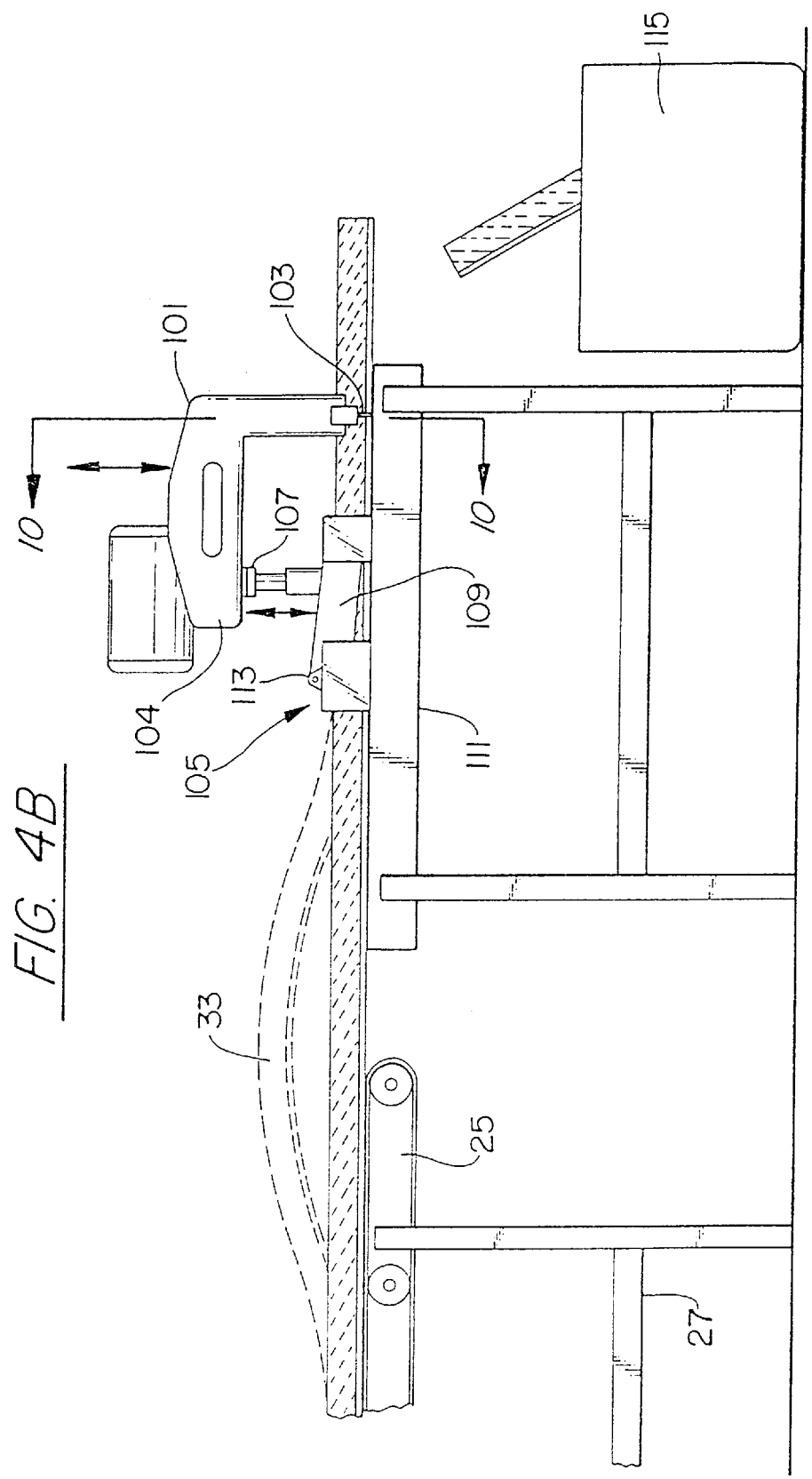

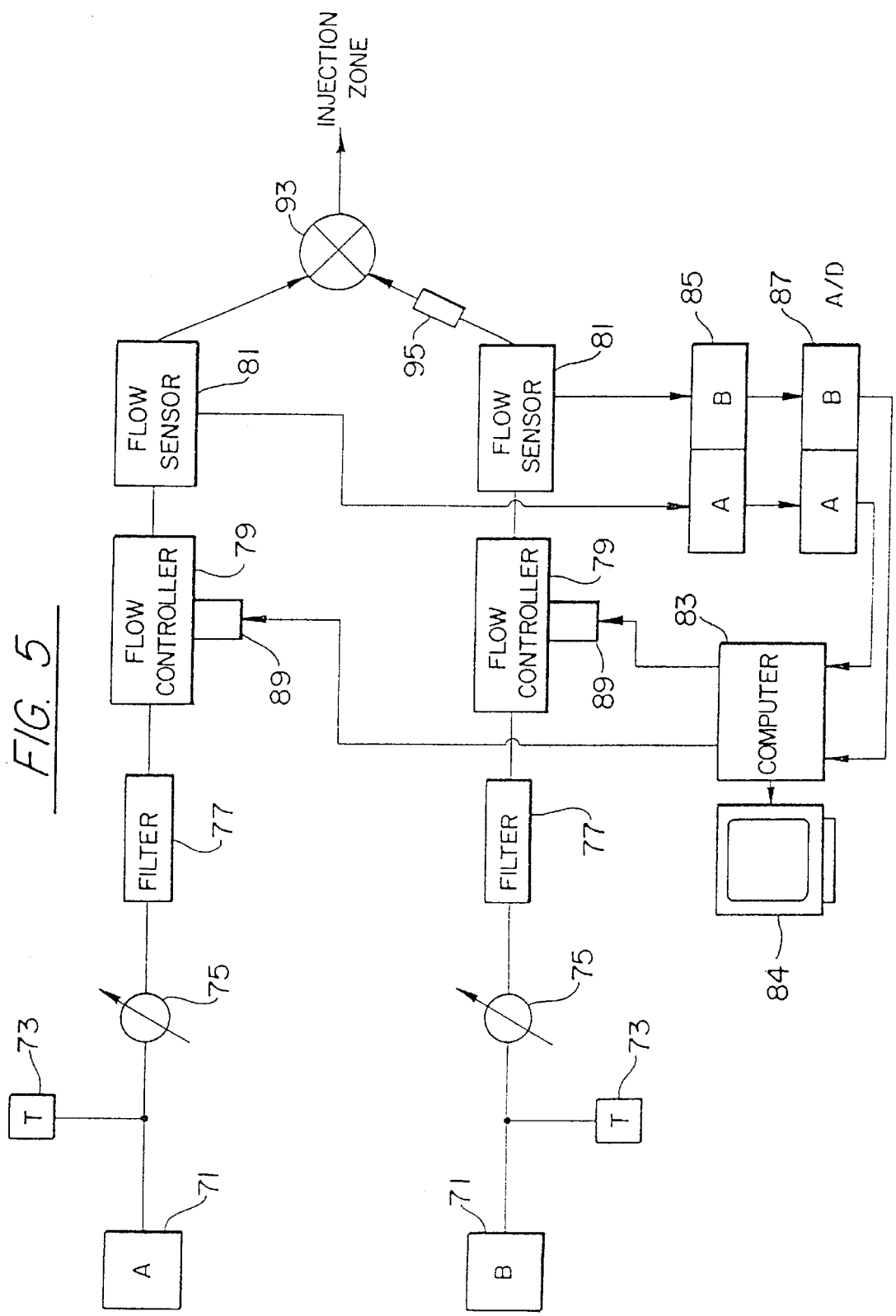

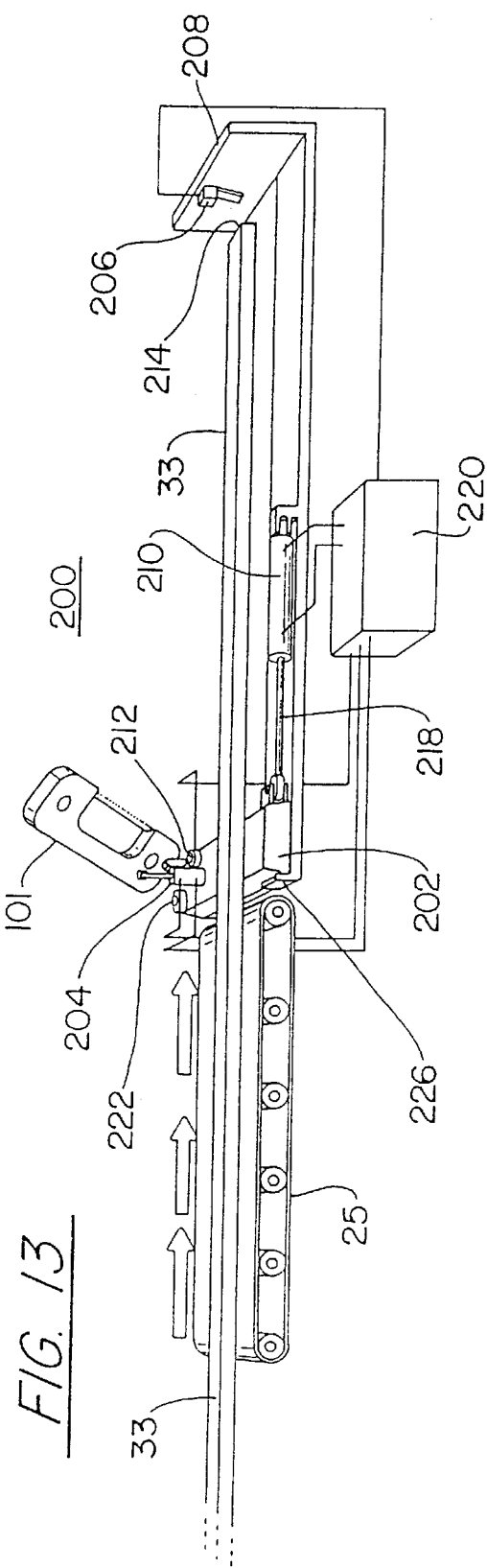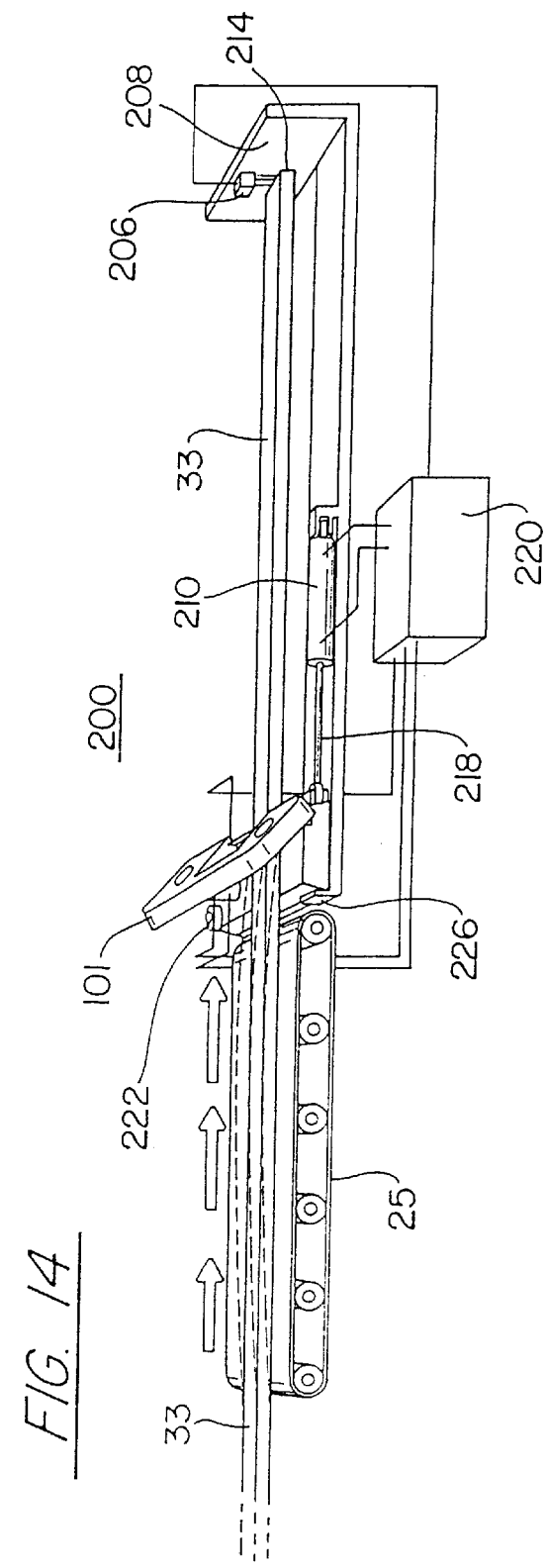

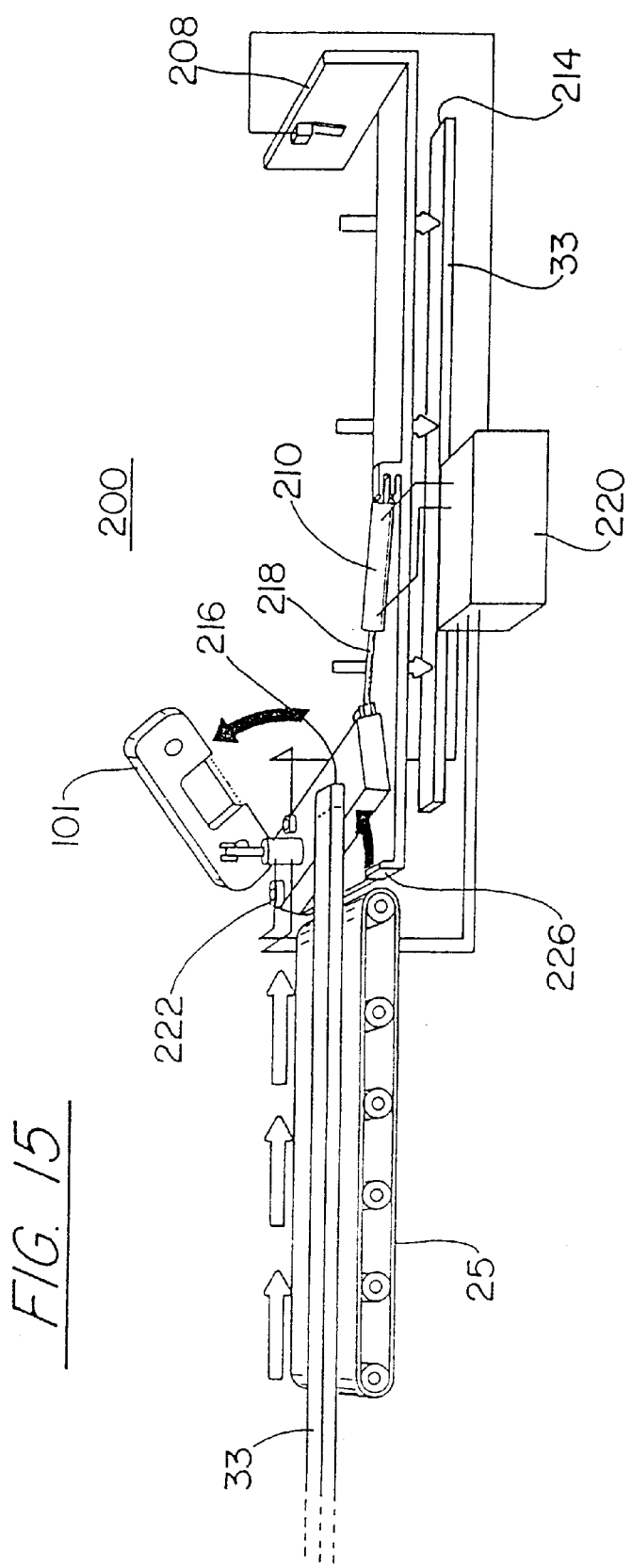

SYSTEM FOR CONTINUOUSLY MANUFACTURING A COMPOSITE PREFORM

CROSS-REFERENCE TO RELATED APPLICATION

This application is a divisional of Ser. No. 08/794,001, filed Feb. 3, 1997, now U.S. Pat. No. 5,897,818, which is a continuation in part of Ser. No. 08/577,800, filed Dec. 21, 1995, now U.S. Pat. No. 5,664,518, which is a continuation in part of Ser. No. 08/345,899, filed Nov. 28, 1994, now is abandoned, which is a continuation in part of Ser. No. 08/181,321, filed Jan. 14, 1994, now U.S. Pat. No. 5,429,066.

INCORPORATION BY REFERENCE

The disclosure of U.S. Pat. No. 5,429,066 is hereby incorporated by reference.

BACKGROUND OF THE INVENTION

This invention relates to an apparatus for manufacturing composite structures. More particularly, the invention relates to an apparatus for manufacturing composite structures which are especially adapted for simplifying fabrication of a number of articles such as boats, ships, body parts for automobiles, trucks, trailers and the like.

U.S. Pat. No. 5,429,066 to Lewit et al. (hereinafter "Lewit et al.") discloses a composite structure and method of manufacturing same. Composite structures manufactured in accordance with Lewit et al. have met with substantial commercial success due to their superior structural characteristics and ability to simplify the fabrication of a number of articles such as boats and other reinforced plastic structures which are manufactured using similar techniques. Significantly, however, it has been found that the manufacture of composite structures in accordance with Lewit et al. can be time-consuming and therefore relatively expensive.

The composite structure disclosed in Lewit et al. is generally comprised of a structural foam core interior surrounded by an outer reinforcing fabric layer. A non-woven fabric layer, such as a mat fiber layer, is attached to the reinforcing fabric layer. A structural foam is attached to the non-woven fabric layer on the side of the non-woven fabric layer opposite the reinforcing fabric, by filling the interstices (pores) of the non-woven fabric layer.

Structural foams are commonly formed using two or more component parts which are mixed together immediately prior to the time that the foam is to be used. For example, the structural foam may be a two part, self expanding, self-curing urethane foam. The component parts are generally mixed together, either in a mixing fixture or in a container, prior to use. Subsequently the foam is deposited in a mold and allowed to cure. The component parts typically comprise a blowing agent which is combined with a resin.

One important factor which must be carefully monitored when manufacturing foam core composite structures is the mass ratio of component parts of the structural foam. If the mass ratio is incorrect, the structural integrity, stability, and water resistance characteristics will be undesirably altered. Due to variations in the consistency and viscosity of the constituent foam parts, it is often difficult to ensure consistent mixing of such parts in a proper mass ratio. In the case of composite structures requiring the injection of large amounts of foam in a mold, this does not create a substantial problem because the consistency and viscosity do not vary as much with high flow rates and are averaged out over time. However, where small amounts of foam are used, foam component ratio variations can create a serious problem.

In a continuous foam core production process as described herein, a second factor which must be carefully controlled is the total foam mass injected. If excessive amounts of foam are injected, the foam will have an undesirable tendency to expand through the non-woven fabric layers and into the reinforcing fabric layers when it is used for production of composite structures as described in Lewit et al.

A common type of structure which is fabricated using the techniques described in U.S. Pat. No. 5,429,066 to Lewit et al. (hereinafter "Lewit et al.") is an elongated beam or stringer (hereinafter "stringer") which may be formed with various cross-sectional profiles. Such stringers are commonly used as structural elements in boat construction and as component parts in many other larger fiber reinforced plastic structures which are manufactured using similar techniques. One method of manufacturing such elongated stringers involves use of elongated molds which can be lined with fabric layers as described above. The molds are then injected with structural foam which has been formed by mixing the proper ratio of constituent parts.

Due to the rather time-consuming process of forming stringers using elongated molds, it would be desirable to provide an apparatus capable of continuously producing a length of composite stringer, such as those which are described in Lewit et al. However, in order to manufacture a composite structure in this manner, careful control must be maintained over the instantaneous mass ratio of the component foam parts as well as the total instantaneous mass of foam injected. Particularly in those instances where the cross-sectional profile of the part defines a relatively small area, the rate of foam injection may be too low to ensure that any variations in the mass ratio of the constituent foam parts are averaged out over time.

Moreover, in the case of self-expanding foam of the type used in processes such as Lewit et al., at least one of the component foam parts is a blowing agent (such as nitrogen and HCFC's) combined with a resin, which must be maintained under pressure prior to use. The resulting component is a foamy, frothy mixture that is difficult to dispense accurately in terms of mass and volume. In fact, equipment of the prior art has generally been found to be capable of providing adequate control over foam component mass ratios only at flow rates above three pounds per minute when using pressurized foam.

Gear pumps such as those manufactured by Viking Pump, Inc. of Cedar Falls, Iowa, have been used to deliver a precisely controlled amount of component foam parts in those instances where the foam resin component parts are not pre-mixed with a blowing agent. However, it has been found that use of resin component foam material which has not been pre-mixed with a blowing agent can cause problems in the manufacture of products such as those described in Lewit et al. In particular, it has been found that where a blowing agent is not added to the resin foam component prior to mixing with the other foam component part(s), the combined component parts comprising the foam, which are expelled from a mixing nozzle, can soak through the layers of non-woven and reinforcing fabric layers lining a mold. This has the undesired result of occasionally allowing foam to penetrate through to the reinforcing fabric layer, which is preferably maintained free of such material in such applications.

Conversely, gear pumps have not been used in applications where pressurized foam components pre-mixed with a blowing agent are used, as such pumps have generally been perceived as redundant in a system where the materials are already under pressure and do not require a pump for causing a flow. Instead, adjustable valve or fixed orifice type flow controllers have been used to control the rate at which the pressurized foam component is allowed to escape. Significantly, however, such adjustable valve systems have been found to be ineffective at delivering a precisely controlled flow of foam component material which has been pre-mixed with a blowing agent, at flow rates of less than about three pounds per minute. Thus, there has arisen a problem with respect to controlling the flow rate of pressurized resin material which is pre-mixed with a blowing agent.

Further, the process of assembling a plurality of beams or stringers into a framework for manufacturing larger composite structures, such as boats and body parts for automobiles, trucks and the like has proven to be time consuming and expensive. One of the difficult and time consuming tasks associated with production of such products relates to the proper positioning of stringers for providing structural support. In manufacturing systems of the prior art, individual stringers are typically manufactured or cut to size, positioned by hand and finally laminated into place for providing any necessary structural support. Positioning jigs are also sometimes used for assisting in the positioning of the stringers. In either case, however, the process of locating the proper size stringer and ensuring that it is placed in the proper position, has proven to be a substantial source of labor expense in assembling these types of composite structures.

Accordingly, it would be desirable to provide an apparatus capable of continuously producing a composite structure of the type disclosed in Lewit et al. It would further be desirable to provide such an apparatus with a foam mixing and injection system capable of accurately dispensing a relatively small volume of foam, and which provides sufficient control over the mass ratio of the constituent foam parts, so as to ensure that the resultant structural foam suffers no defects. Finally, it would be desirable to provide a method and apparatus for manufacturing composite stringer elements in attached multiple sets (i.e., production of more than one beam using a single reinforced fabric layer) so as to simplify construction of larger reinforced composite structures using said stringers and reduce production times for an end user of such stringers.

SUMMARY OF THE INVENTION

It is an object of the invention to provide an apparatus for manufacturing a composite structure.

It is a further object of the invention to provide an apparatus for continuously manufacturing a composite structure having a structural foam core wherein the constituent structural elements comprising the injected structural foam are consistently mixed so as to have the proper mass ratio, particularly at low flow rates.

It is yet another object of the invention to provide a foam injection apparatus for continuously dispensing a two or more part structural foam with a proper mass ratio, despite variations in the viscosity and consistency of the constituent parts.

It is another object of the invention to provide a means for manufacturing multiple composite structures concurrently, using a single reinforced fabric layer.

These and other objects of the invention are accomplished by a continuous composite structure manufacturing apparatus which comprises a conveyor or conveyors for conveying one or more fabric webs along a conveying path. Each of the webs is preferably comprised of a reinforcing fabric, a non-woven fabric, or a layered fabric. In referring to a layered fabric, it should be understood that such fabric is comprised of a reinforcing fabric layer attached to a non-woven fabric layer on one side thereof. In any case, the fabric web is passed through the conveyor in such a way so that it defines an enclosed foam injection zone.

Two distinct injection system can be used for injecting foam into the foam injection zone to form a foam core preform (or a plurality of same). One or more dies are preferably positioned along the conveying path, to shape each of the foam core preform(s) to the desired cross-sectional profiles. In either case, the foam injection system is preferably a feedback-type system which constantly monitors the relative mass of constituent component foam parts which are mixed together to form the structural foam.

The first system is designed for use in those instances where a blowing agent is pre-mixed, e.g. by a foam component manufacturer, with at least one of the component parts of the foam material. Typically such blowing agent is in the form of liquid nitrogen or liquid $CO_2$ and it is therefore necessary to maintain the foam component material pressurized. In one aspect according to the invention wherein such pre-mixed foam component parts are used, gear pumps and gear flow meters are utilized in a unique manner to provide for precise control of the amount of each foam component part which is mixed. In this way, a desired ratio of foam parts is constantly maintained with great precision, even at low flow rates. Unlike systems of the prior art, the apparatus does not utilize the gear pumps to create a flow of constituent foam material, but instead uses such pumps to limit the amount of pressurized material escaping from a holding tank. This control is achieved by limiting the rotational speed of a braking motor attached to the gear pump or by means of an electro-mechanical braking system operatively connected to the gear pump. In either case the braking action is preferably controlled by means of a feedback system which monitors the flow of component foam material and then electronically controls the gear pump braking motor or electro-mechanical braking system so that the proper flow rates are consistently maintained.

As an alternative to the foregoing approach, a second type of system may be utilized which avoids some of the difficulties associated with controlling flow rates of pre-mixed type foams which must be maintained under pressure. The alternative approach is particularly advantageous for use in those localities where self expanding foam components of the pressurized variety are not conveniently available. In this approach, conventional gear pumps are used to produce a precisely controlled pumped flow of foam component material, which has not been pre-mixed with a blowing agent. This approach has the advantage of avoiding the more difficult task of controlling the flow rate of pressurized foam constituent material which is pre-mixed with a blowing agent. After the proper amount of foam constituent material is dispensed by the gear pump, a blowing agent such as $CO_2$ is pre-injected into the resin component line. The resin with the pre-injected $CO_2$ is subsequently passed through a static mixer that "foams" the resin component material prior to being mixed with the remaining component or components which form the final foam product.

Finally, a system is disclosed for simultaneously manufacturing multiple, spaced apart, stringers using a single large sheet of fabric webbing such as a reinforcing fabric, non-woven fabric or attached fabric layers. Multiple stringers are produced concurrently in a continuous production process that utilizes the foam injection system as described above.

BRIEF DESCRIPTION OF THE DRAWINGS

Having thus briefly described the invention, the same will become better understood from the following detailed discussion, read in conjunction with the drawings wherein:

FIG. 2 is a cross-sectional view of a typical stringer construction made utilizing the apparatus according to the invention.

FIG. 3 is a perspective view of a stringer manufactured with the apparatus of the invention.

FIG. 4A is a side elevation view showing a first portion of the apparatus according to the invention.

FIG. 4B is a side elevation view showing a second portion of the apparatus according to the invention.

FIG. 5 is a block diagram showing the operation of the foam mixing and control system.

FIGS. 13–15 illustrate sequences of an automatic cutting arrangement.

DETAILED DESCRIPTION OF THE PREFERRED EMBODIMENTS

Figure 1:
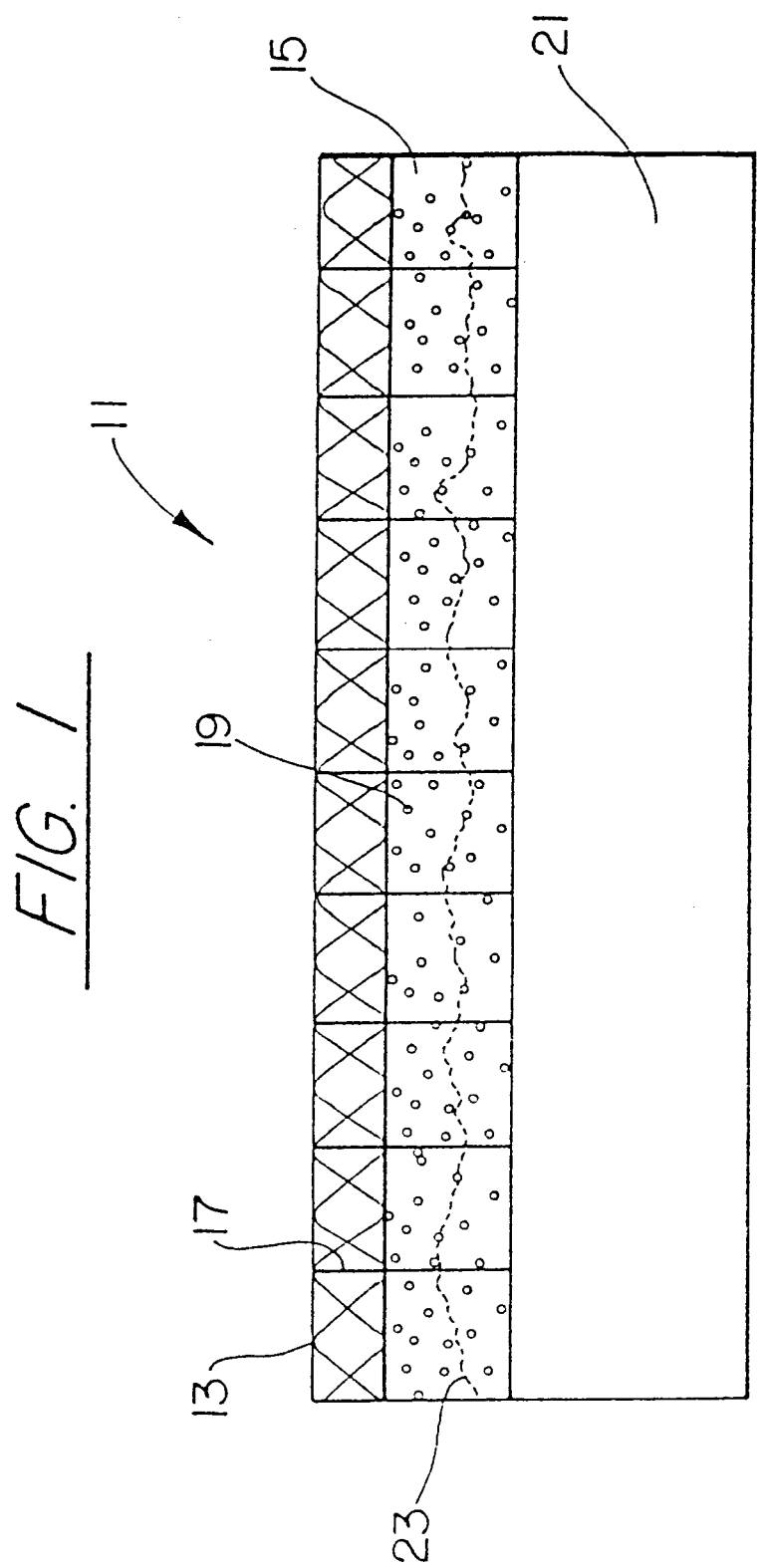
FIG. 1 is a partial, side cross-sectional view of a composite structure to be manufactured with the invention.

FIG. 1 illustrates a typical construction for a composite structure 11 to be manufactured utilizing the invention. The structure 11 is made up of a structural foam 21 attached to a non-woven layer 15 and a reinforcing fiber layer 13.

The non-woven layer is preferably a material such as is commercially available under the trade name Trevira Spunbond from Hoechst Celanese Corporation. The non-woven layer is generally a non-woven fabric composed of continuous thermoplastic fiber, needle punched together to yield a felt-like fabric. In addition to fabrics like Trivira Spunbond, other materials such as polyester staple mat, glass fiber mat, as well as other organic and inorganic fiber mats and fabrics can be employed.

Reinforcing fiber layer 13 is preferably a directional reinforcing fiber layer of organic or inorganic structural reinforcing fibers such as fiberglass, carbon fibers, aramid fibers which is available from DuPont Corporation under the trade name Kevlar, linear polyethylene or polypropylene fibers such as is commercially available from Allied-Signal, Inc. under the trade name Spectra, or polyester fibers. It should be understood that the phrase "reinforcing fiber" is meant to include any fiber which, when added to a composite material, enhances the structural properties of the material. The fibers can be randomly oriented, or preferentially, they can be oriented in one or more directions. While a number of specific types of materials have been given for use as the reinforcing fiber layer, it will be appreciated by those of ordinary skill in the art that other equivalent-type reinforcing fiber layers can be employed in the practice of the invention.

The reinforcing fiber layer 13 is attached to a non-woven fiber layer 15 which has a large number of interstices or pores 19. Preferably, the reinforcing fiber layer 13 and non-woven fiber layer 15 are secured to each other mechanically. Such mechanical attachment is typically done by conventional stitching 17. Significantly, however, other means of attachment may also be used and the invention is not limited in this regard. Such alternatives include needle punching, stapling or buttons. In the case of certain non-hostile environment applications, adhesives can also be used.

The structural foam 21 is attached to the non-woven layer 15 by having penetrated into the interstices 19 at penetration region 23 of the foam 21 during the manufacture of the structure 11. Preferably the foam is a self-expanding, self-curing urethane foam which has been caused to expand at region 23 into the interstices 19 of non-woven layer 15. Such penetration into the interstices may be facilitated by filling a foam injection zone with the structural foam 21 in an amount sufficient to cause pressure as a result of expansion of the foam 21 to penetrate at region 23 into the interstices 19 of the non-woven layer 15. Such pressure also results in a more densely packed foam, for example, approximately 20% more dense.

Figure 10:
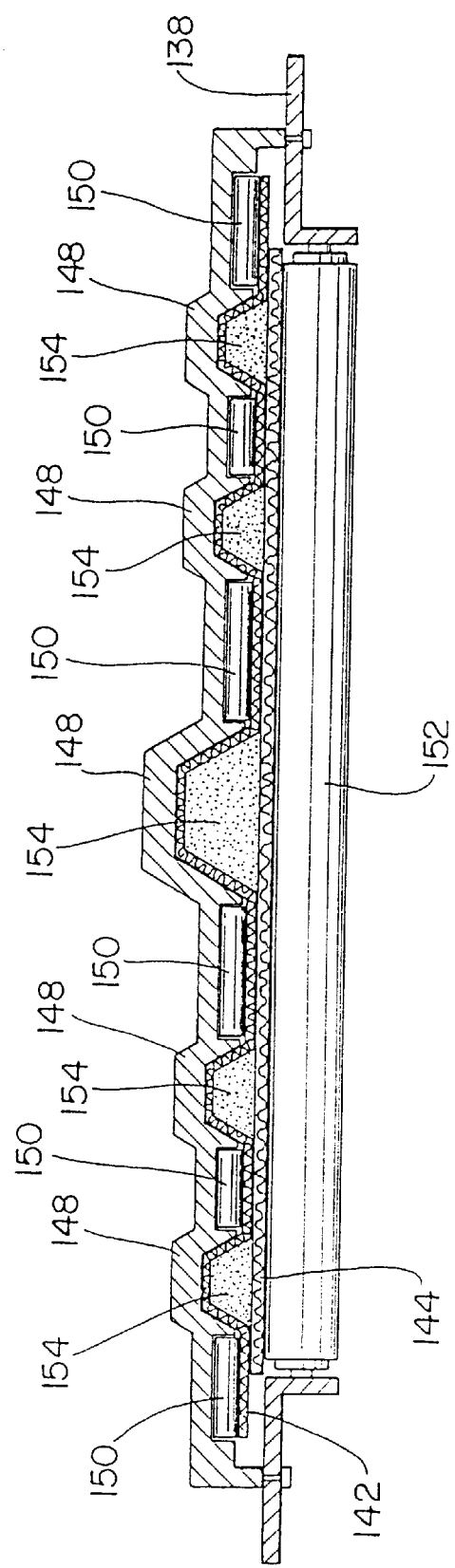
FIG. 10 is a cross-sectional view of the invention in FIG. 9, taken along line 10—10.

A typical composite structural member 51, for example a stringer or a beam, which can be manufactured with the invention is more fully illustrated in FIGS. 2 and 3. The member 51 preferably includes a number of flaps 55 made up of secured non-woven fiber layer 15 and reinforcing structural fiber layer 13. The member illustrated in FIGS. 2 and 3 is roughly rectangular in cross-section. However, it should be noted that such members can be provided with any desired cross-section as may be necessary for a particular application. For example, the members may be formed triangular in shape, if a die is chosen shaped in the manner shown in FIGS. 6 and 7, or may be formed trapezoidal in shape, as shown in FIG. 10.

One method of making the composite structure described above, is taught in U.S. Pat. No. 5,429,066 to Lewit et al. As explained therein in greater detail, the non-woven fabric layer 15 is first attached to the reinforcing fabric layer 13, preferably by stitching. After attaching the two layers of fabrics together, the attached fabric layers are laid in a mold with the non-woven layer 15 facing the inside of the mold. Next, a self-expanding, self-curing structural foam is prepared/mixed. Typically, such a self-rising, self-curing foam is a urethane foam commercially available from BASF, MOBAY, PPG and is typically an MDI-based rigid polyurethane foam (methylene-diphenyl-methane diisocyanate) using "hydrogenated chlorofluorocarbons" (HCFC), water and/or $CO_2$ as a blowing agent.

The mold is subsequently filled with the self-expanding and self-curing structural foam in an amount sufficient to allow for expansion of the foam after the mold is closed. The mold is then closed and the foam is allowed to cure and expand therein. This generates enough pressure so that the foam penetrates into the interstices 19 of the non-woven fabric layer 15.

Regardless of the method which is used, enough foam is added to generate pressures in the range of approximately 5–18 "pounds per square inch" (psi), at a minimum of approximately 5 psi, and at an optimum pressure of approximately 10 psi. Different mold pressure may be used, however, and upper pressure limits are dictated primarily by mold strength. For a desired or given mold pressure, foam amounts and thickness of the non-woven layer can be adjusted so that the mold completely fills with the foam, but the foam does not penetrate through the reinforcing layer. Finally, the formed article is allowed to cure, and is removed from the mold.

With regard to the method described above, the precise mass of foam dispensed into the mold is preferably determined experimentally to achieve penetration of said foam into the non-woven layer, but not into the woven layer of the attached fabric layers.

For mass production of composite structural members, such as beams, stringers and other elongated composite members, the foregoing method has been found to be relatively time consuming and, therefore, expensive. Accordingly, FIGS. 4–7 illustrate an apparatus for continuously mass-producing composite structural members such as those described above. As shown in FIG. 4A, the apparatus includes a conveyor 25 mounted on a base 27. Conveyor 25 is preferably a belt conveyor driven by an electric motor.

Means are provided for dispensing elongated webs 43, which may be comprised of either non-woven fabric layer, reinforcing fabric layer, or attached fabric layers as described above. In referring to attached fabric layers, it should be understood that such terminology refers to a reinforcing fabric layer attached to a non-woven fabric layer on one side thereof as described above. A single, non-woven or reinforcing fabric layer may be used to form a side of the stringer part which does not need to remain free from structural foam.

In a presently preferred embodiment, the elongated fabric webs 43 are stored as fabric rolls 29, which can be rotatably mounted so that fabric may be drawn off each roll as needed. Each fabric roll is mounted so that its central axis is perpendicular to the direction of the conveying path and aligned therewith. Mounting the fabric rolls in this manner helps to ensure that the fabric does not become twisted or distorted as it is drawn toward the conveyor. In FIG. 4A, one fabric roll 29 is shown mounted within base 27 and one fabric roll is mounted in a fabric roll stand 31. Significantly, however, the invention is not so limited, and other mounting arrangements may also be used, provided that fabric webs are smoothly guided to the input side of conveyor 25. Web guides, such as rollers 32, are preferably provided for directing the fabric toward the conveyor.

Figure 6:
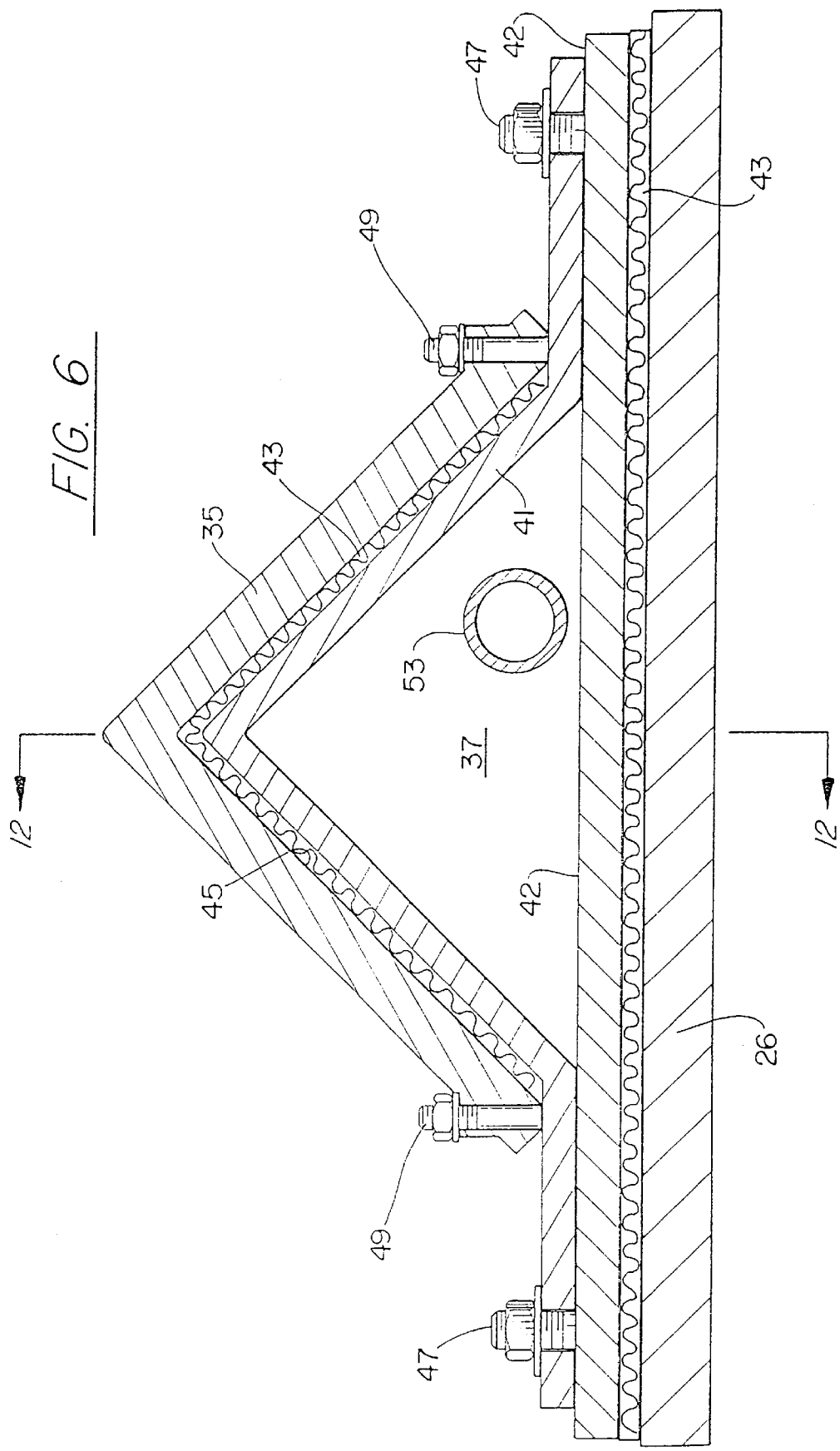
FIG. 6 is a cross-sectional view taken along line 6—6 in FIG. 4A.
Figure 7:
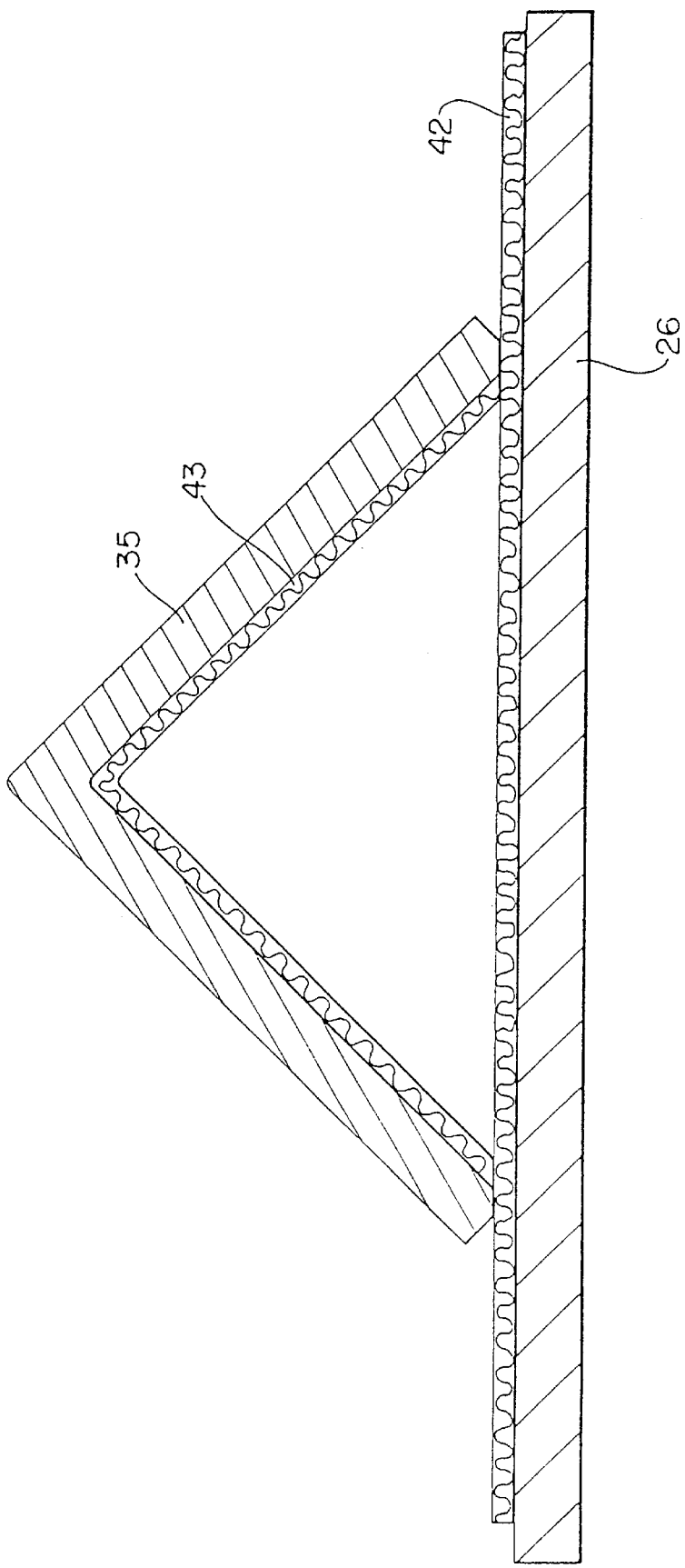
FIG. 7 is a cross-sectional view taken along line 7—7 in FIG. 4A.

Mounted on an input side 28 of the conveyor is die 35 which is provided for shaping and forming a composite structural member 33 to a desired cross-sectional profile. The die may be formed from any rigid material, such as wood, or UHMW plastic, which is sufficiently strong to withstand the pressure of the structural foam as it expands within the die. With further reference to FIG. 6, the input side 39 of the die 35 is shaped for receiving a fabric web 43, and for defining a foam injection zone 37. Foam injection conduit 53 is provided for directing a flow of foam to a foam injection nozzle (not shown) placed in the area of the foam injection zone.

An upper fabric guide 41 is provided to aid in smoothing the fabric web and properly positioning same as it passes over the inner surface of the die 35. In order to accomplish its intended purpose, upper fabric guide 41 is preferably mounted at least partially within die 35, and slightly spaced apart from its inner surface 45, as shown in FIG. 6. The upper fabric guide 41 may be mounted directly to die 35 as shown with positioning bolts 49, or may be fixed in position by other suitable means.

A lower fabric guide 42 is provided for smoothing and ensuring proper positioning of a second fabric web 43 as it approaches foam injection zone 37, defined within the interior of die 35. As shown in FIG. 6, lower fabric guide 42 is preferably attached to upper fabric guide 41 by means of threaded securing bolts 47. However, the invention is not limited in this regard, and the upper and lower fabric guides may be independently supported by other means such as side rails (not shown) which are mounted to and extend along a portion of the length of conveyor 25. The lower fabric guide 42 is preferably mounted so that it is spaced slightly above the surface of conveyor belt 26 so as to permit the passage therethrough of fabric web 43, while simultaneously preventing bunching or creasing of same. The upper and lower fabric guides may be formed from any suitable rigid material which is also sufficiently thin to avoid interfering with the passage of fabric webs 43. For example, a light gauge sheet metal may be used for this purpose.

Figure 6A:
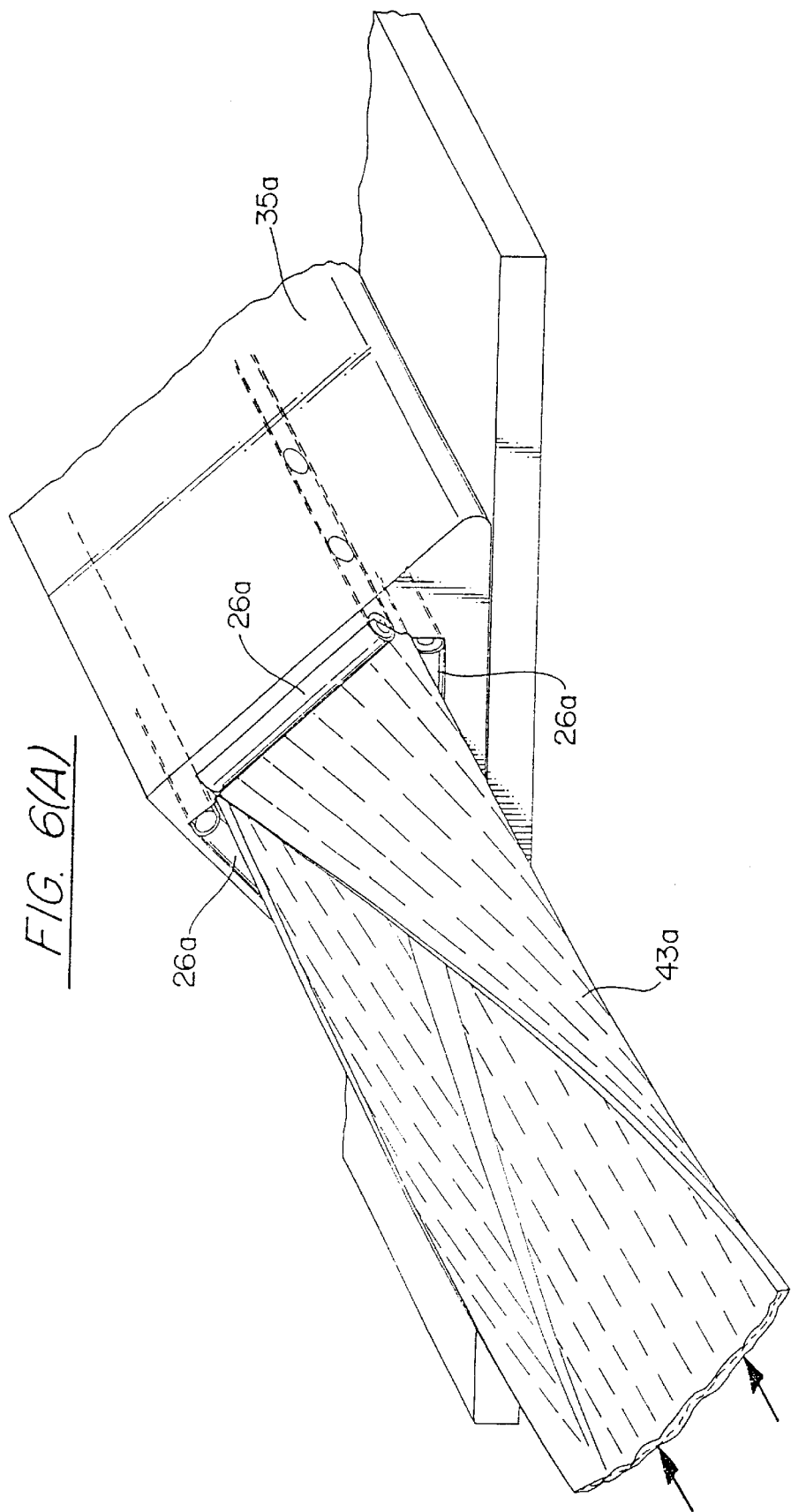
FIG. 6(A) is a perspective view of an alternative embodiment of the invention.

The precise number of fabric webs used can be varied depending upon the cross-sectional shape of the composite structural member to be manufactured and its size. For example, in an alternative embodiment, a single web of fabric may be used with the invention if it is guided in such a manner that it will completely line a perimeter of a foam injection zone. This can be accomplished in the manner shown in FIG. 6(A) wherein a single fabric web 43(a) is drawn by a plurality of conveyors 26(a) through a die 35(a). It should be noted that in FIG. 6(A), fabric guide 41 has been omitted for clarity. Also, it should be understood that FIG. 6(A) is merely one example of the manner in which fabric web may be used to line the perimeter of the foam injection zone and the invention is not limited in this regard.

Figure 12:
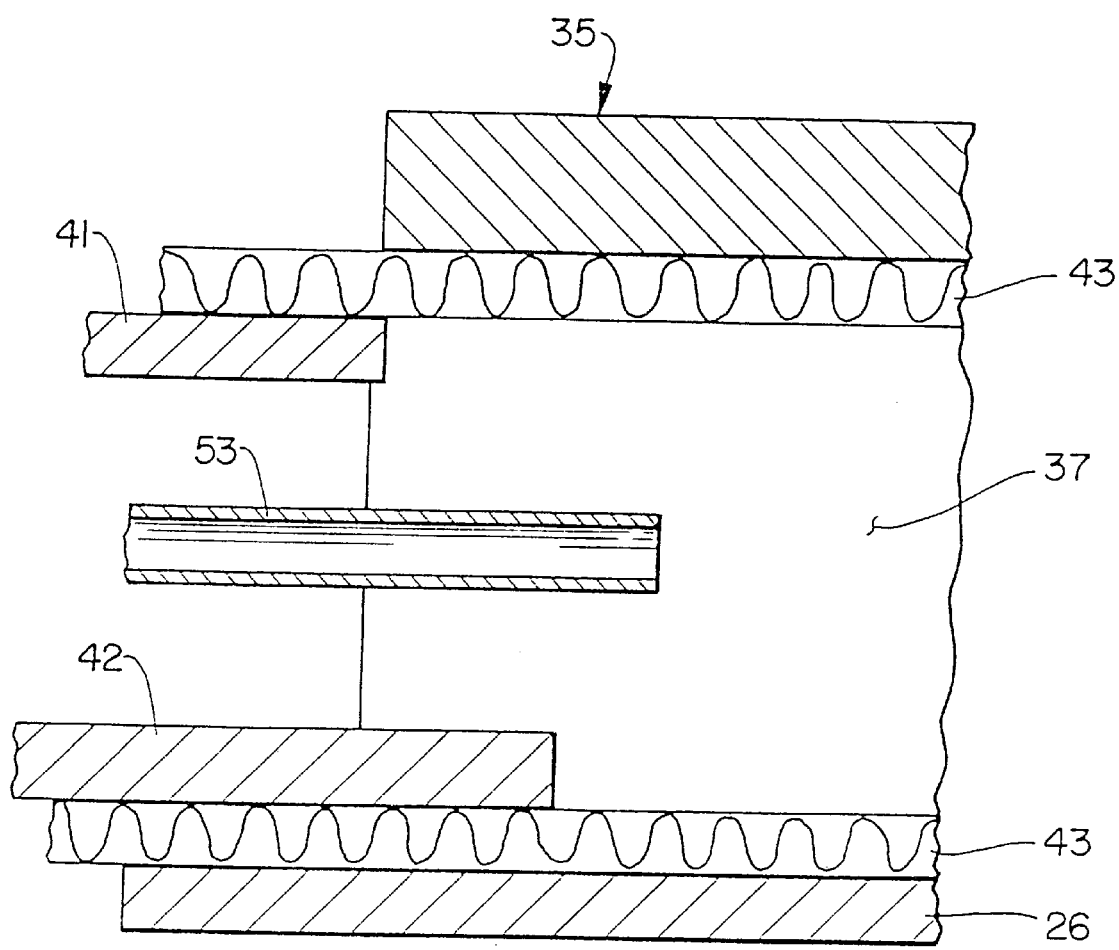
FIG. 12 is a cross-sectional view taken along the line 12—12 in FIG. 7.

The injection zone 37 is shown more fully in FIG. 12. The entrance end of the die 35 is at the left of the figure. The upper fabric guide 41 ends at the entrance of the die. The lower fabric guide 42 extends through the entrance and into the die by a short distance. The end of the foam injection conduit 53 projects through the entrance, entending shortly past the end of lower fabric guide 42. The mixed foam is discharged through a conventional nozzle (not shown) on the end of conduit 53. The injection zone 37 is defined at the outlet of the conduit/nozzle. As a result, foam injected into the foam injection zone will be permitted to expand and fill the interstices of the fabric web 43, and bind itself thereto.

According to a presently preferred embodiment of the invention, the length of the die and the conveyor speed are chosen so that injected foam has sufficient time to harden before it is transported out of the die. Further, conveyor speed must be sufficient to accommodate a given volume of foam being injected into a composite structural member of a given cross section. With these considerations, it has been found that the die length is preferably between approximately 10 to 50 feet, depending upon the speed of production and size of the part. In general, it is desirable to control the conveyor speed and die length so that each portion of the part being produced is enclosed within the die for a period of time between approximately 30 seconds and 2.5 minutes.

As noted above, it is extremely important for the purposes of maintaining a consistently high quality product, to maintain the proper mass ratio of the constituent parts which must be mixed to form the structural foam. If the mass ratio is incorrect, the structural integrity, stability, and water resistance characteristics will be undesirably altered. The problem of maintaining proper ratio of component parts is particularly difficult to overcome at low flow rates, i.e. less than about three pounds per minute of foam and where component foam parts are used, which have been pre-mixed with a blowing agent.

For the purposes of the present invention, it is preferable to make use of a foam formed from two or more component parts wherein at least one of the component parts has been pre-mixed with a blowing agent. Pre-mixing of the blowing agent with at least one of the foam parts is preferred in this continuous manufacturing system because it advantageously helps to ensure that the foam dispensed into the injection zone does not soak through the fabric layers lining the zone. Foam systems which inject a blowing agent only at the point of an injection nozzle, just prior to dispensing, tend not to foam quickly enough to avoid this soak through problem. Pre-mixed foam which has been found to be particular suitable for the present invention is Autofroth 9300A Isocyanate, which is commercially available from BASF Corporation Polymers Division, 1609 Biddle Avenue, Wyandotte, Mich.

FIG. 5 illustrates a foam mixing and dispensing control system designed especially to accommodate precision foam component dispensing requirements which are required where the cross-sectional profile of the manufactured part being produced is relatively small. The following cross-sections and flow rates are illustrative. A cross-section of approximately 0.3 square inches requires a flow rate of each component of approximately 30 gm/min. A cross-section of approximately 4.5 square inches requires a flow rate of each component of approximately 1 lb/min, equivalent to approximately 476 gm/min. A cross-section of approximately 14.4 square inches requires a flow rate of each component of approximately 3 lb/min. As shown therein, the system includes temperature controlled foam component part storage canisters 71 in which the component foam parts are maintained under pressure. In the case of Autofroth 9300A Isocyanate type foam, the foam is preferably maintained at a pressure of between approximately 80 and 160 p.s.i., and at a temperature of in a range between approximately 78 to 83 degrees Fahrenheit. The foam component parts are maintained in this temperature range so as to control the rate at which the foam hardens. Any suitable equipment may be used for maintaining the constituent foam parts within the desired temperature range.

In FIG. 5, only two canisters 71 are shown. It should be understood however, that in those instances where foams comprised of more than two component parts are required, additional canisters 71 would also be provided. The same applies to the remainder of the flow control apparatus as described below. Accordingly, the invention is not limited to those systems using a two-part structural foam.

The temperature compensation of canisters 71 is important for the purpose of avoiding variations in foam component part density. The ability to maintain a stable foam component density is important for enabling precise control over the mass ratio of the constituent parts which are mixed to form the structural foam. As will be described in greater detail below, the system only indirectly measures the mass of constituent foam parts to be mixed, i.e. by measuring volumetric flow rates and then converting to a mass flow rate using a density conversion factor. If the temperature of the foam component parts are maintained constant, then the density of such component parts will also remain constant and the conversion factor will always remain the same. However, if the temperature (and therefore the density) are permitted to vary, then the volumetric measurement cannot accurately predict mass flow rates.

The foam component parts contained in storage canisters 71 are each connected by an insulated conduit to an on/off valve 75 for gross control over flow of foam component parts. Temperature sensor 73 is provided along the foam conduit for constantly monitoring foam component part temperature.

Filters 77 are provided for trapping any impurities contained in the foam component parts. Filters 77 are preferably mounted along the insulated conduit as shown in FIG. 5, so that any impurities are removed prior to the component foam parts passing to the flow controller. Hydraulic oil filters have been found to work well for this purpose. However, any other suitable filter element may be used, and the invention is not limited in this regard.

After passing through the filters 77, the foam component parts must pass through precision flow controllers 79. Flow controllers 79 may be either manually adjustable or computer controlled, as discussed below. The flow controllers are preferably high accuracy gear pump type units to enable a precise control of flow for component foam parts at rates below one pound per minute.

Figure 8:
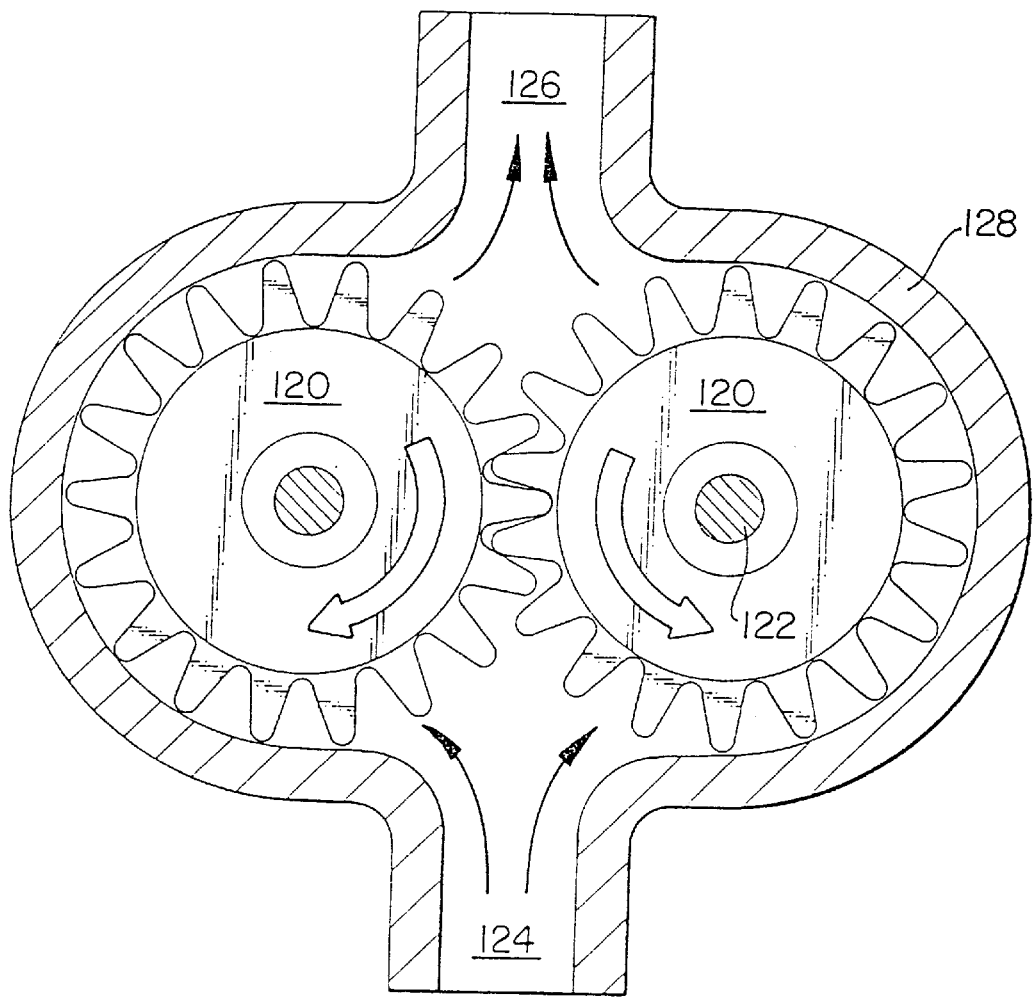
FIG. 8 is a cross-sectional view of a gear pump.

Generally speaking, gear pumps are comprised of a pair of meshed gears which are closely fitted within a housing as shown in FIG. 8. At least one of the gears 120 is connected to an output shaft 122 so that the gears may be rotated, e.g. by an electric motor (not shown). The gears 120 are exposed on an input side 124 of the housing 128 to a liquid material, which is captured in the spaces between the gear teeth as they rotate. The liquid is then expelled from the gears at an output side 126 of the housing where the two gears mesh together.

Significantly, however, rather than using such a gear pump in a conventional manner, i.e. to pump resin (which in this case is already under pressure), the pumps are instead limited in their rotational speed by braking unit 89 as shown in FIG. 5. Braking unit 89 may be comprised of any suitable electrical, electro-mechanical, or mechanical device which is capable of a limiting the rotational velocity of the gear pump-type drive shaft 122.

Suitable gear pump units for this application have been found to include spur gear single pumps such as series SG-05, which are commercially available from Viking Pump, Inc. of Cedar Falls, Iowa.

Braking units can include, for example, a variable speed DC motor with an electronic controller for controlling the rotational speed of the pump. A 1 horsepower, 90 Volt D.C. variable speed electric motor has been found to be suitable for this purpose. As an alternative embodiment, a friction brake of any suitable design may also be used to limit the rotational velocity of the gear pump drive shaft. The friction brake is preferably dynamically controllable so that it can be used to vary the resistance applied to an output shaft of the gear pump-type flow controller. In a preferred embodiment, the friction brake is an electro-mechanical or hydraulic unit which can be electronically controlled via a computer as discussed below and shown in FIG. 5.

In order to dynamically monitor and control flow rates of the constituent foam parts from the gear type flow controllers 79, such flow is monitored by volumetric flow sensors 81 which are also preferably comprised of two precisely matched gear wheels enclosed in a very accurately machined housing. The space between the gear teeth, when fully enclosed by the housing, constitute measuring chambers. Fluid flow causes the gears to rotate, thereby permitting very accurate flow measurements. Acceptable units for this application include the VS series of precision flow meters available from VSE Volumentechnick GmbH.

The flow rate measured by the flow sensors 81 is preferably converted by the flow sensor to an electronic signal so that the information may be processed by computer 83. In the case of the VS series type flow meters, a square wave output signal is generated by a detection circuit incorporated into the flow meter. The signal frequency is proportional to the instantaneous flow rate and varies from between about 0 to 2000 Hz., depending upon the particular flow meter used and the rate of flow. The gear type flow meters are presently preferred for the present invention. However, the invention is not necessarily limited in this regard, and any other type flow meter may also be used, provided that it offers similar levels of precision and that the output can be converted into a computer readable form.

Computer 83 is preferably an IBM type personal computer operating with an Intel-type 486 or Pentium-type microprocessor. A monitor 84 is also preferably provided to allow an operator to observe the mass ratio and other important information derived from the flow sensors 81. However, any computer capable of performing the tasks set forth below, in real time, may be used for the within invention, and the invention is not limited in this regard.

As shown in FIG. 5, the electronic output of the flow sensors 81 is preferably electronically coupled to computer 83 for processing. This can be accomplished in any appropriate manner as is well known to those in the art. For example, if the computer 83 is configured so that it is capable of reading the electronic output of the flow sensor 81 directly, the flow sensor output can be electronically coupled directly to the computer 83. Alternatively, in the case of the gear type flow meter units described above, a two-channel pulse input totalizer 85 is preferably used to convert the total number of pulses generated each second by each flow sensor 81, to a D.C. output voltage. The D.C. voltage output of the totalizer is then coupled to a two-channel analog to digital converter 87, as shown in FIG. 5. The output of the analog to digital converter 87 is coupled to a data acquisition channel input associated with the computer 83. Once again, however, it should be noted that the foregoing data acquisition setup for computer 83 is merely exemplary, and the invention is not limited to any specific arrangement.

Once the flow rate data is acquired by the computer 83 for each of the component foam parts, the data is processed to facilitate optimization of the foam component part mass ratios. This can be accomplished by either of two methods. According to one method, the data can be converted into a numerical or graphical format which, when viewed by an operator, can be used to manually adjust the flow controllers 79. Alternatively, the data can be analyzed by the computer 83 and, depending upon the results of the analysis, the computer can electronically adjust the flow controller to instantaneously increase, decrease or maintain the rate of flow. If the computer 83 is used to directly control the flow controllers 79, the flow controllers are preferably operated by electro-mechanical control means such as servo motors 89.

Regardless of whether the component foam part flow rates are manually controlled, based upon the measured data, or directly controlled by computer 83, the computer preferably displays at least mass ratio and flow rate information on monitor 84.

Once the foam component parts pass through the flow sensors 81, at least the component part which has been pre-mixed with a blowing agent is passed through a needle valve 95. The needle valve is any common variable flow needle valve available in any hardware store and is provided to ensure that the pre-mixed liquid resin remains under pressure until just before reaching the mixing head 93. Maintaining pressure of at least approximately 80 lbs. on the pre-mixed liquid resin is important because failure to do so will cause the blowing agent in the resin to expand. Once this occurs, the resin will become a frothy, foamy mixture which is extremely difficult to control and hard to meter with flow sensors.

Finally, both component parts of the foam are carried through conduits to a mixing head 93. The mixing head 93 may be either a static type unit or mechanically driven with a mixing propeller. In the illustrated mixing arrangement, a static mixer protrudes through the fabric guides and just beyond, into the injection zone 37, as explained in connection with FIG. 12.

With the foam injection system according to the invention, two significant results are achieved. First, the structural foam can be dispensed at very low volume rates which are suitable for continuous production of composite structural members, such as stringers or other composite structures. The system described herein has been found to be capable of consistently dispensing a total foam output of less than three pounds per minute, and as low as 30 grams per minute, with a total variation of +/−5%. By comparison, systems which are presently available for dispensing foam comprised of a component part which has been pre-mixed with a blowing agent are capable of accurately dispensing 3 pounds per minute, or greater. The ability of the present invention to consistently dispense small foam volumes with minimal variations is crucial to the continuous process manufacture of foam core composite structural members such as beams, stringers and the like.

Further according to the invention, the composite structural member thus produced passes through the die 35 and is shaped into the desired cross-sectional profile. Upon exiting die 35, the member continues down the conveying path toward cutter 101 and bench 110. Cutter 101 is a power cutting tool for cutting the elongated composite member 33 to a desired length. Cutter 101 is a preferably a band saw with a scalloped cutting blade. In a preferred embodiment shown in FIG. 4B and FIG. 10, cutter 101 is pivotally mounted so that the cutter blade 103 may be retracted upwardly out of the path of the member 33 as it is conveyed down conveyor 25.

Once the apparatus according to the invention has begun operating, and production is proceeding, it may not be practical to temporarily disable the conveyor and foam injection system to allow time to cut the member to a suitable length. Nevertheless, the member must be cut at some point. Accordingly, the apparatus provides a system to facilitate such cutting without interrupting production.

A first, manual cutting arrangement is explained in connection with FIG. 4(B). Specifically, when a desired length of member 33 has been driven by conveyor 25 beyond a cutting zone defined by cutter blade 103, the cutter 101 is pivoted downwardly, either manually or by other means, to bring the blade 103 in contact with the member 33. In order to temporarily maintain the member 33 in a stationary position within the cutting zone, an automatic locking system is employed to operate in conjunction with the cutter 101. When the cutter 101 is pivoted down to a cutting position, the frame of cutter 101 depresses a plunger 107. When forced downwardly by the movement of the cutter frame 104, the plunger 107 causes rocker arm 109 to rotate on pivot 113 and to depress against stringer 103, thereby locking it in place. Rocker arm 109 is preferably profiled to the same shape as the upper surface of the stringer 33 in order to evenly grip the exposed surface of the stringer.

The conveyor and stringer production are not disabled when the rocker arm 109 is depressed against the stringer 33. Instead, the locking action of the rocker arm 109 causes the newly manufactured stringer 33 to bow upwardly. In order to bias the stringer toward an upward bow, blocking elements or spacers positioned beneath the newly formed stringer, may be provided so that the stringer 33 is maintained in a slightly upwardly bowed position, even when rocker arm 109 is not locked in position. Accordingly, when a length of stringer 33 is to be cut, the conveyor and foam injection apparatus continue to produce the stringer, and the additional length is taken up when the stringer arcs as shown in FIG. 4B. After the stringer is cut to the desired length, it may be gravity-fed to a container 115 for storage or shipping.

A second, automated cutting arrangement 200 is explained in connection with FIGS. 13–15. The saw arm 101 is pivotally mounted to a base 202 for up and down movement through a cutting plane defined by vertical movement of the saw blade. The base 202 is pivotally mounted on a bearing arrangement 222 for movement transverse to the cutting plane, moving in an arc substantially parallel to the conveying plane of the member being cut.

The saw arm 101 is moved up and down by an air cylinder 204. The air cylinder is responsive to a limit switch 206 on an end stop 208 which is positioned according to the desired length. The base 202 is moved back and forth along the arc by a ram 210. The ram is responsive to a limit switch 212 which is positioned on the base to detect the lowest position of the saw arm, after the blade has cut through the member.

In accordance with the cutting process, the saw arm is raised and the base, with the saw arm, is in an initial position as shown in FIG. 13, perpendicular to the member to be cut. The member 33 is being moved to the right by conveyor 25. When the end 214 of member 33 engages the limit switch 206 in the end stop, as shown in FIG. 14, the following sequence of events takes place. The air cylinder 204 moves the saw arm 101 downwardly as the saw blade cuts through the member 33. The member falls away or is otherwise removed, as shown in FIG. 15. At this point, the new end 216 of the member 33 begins moving past the saw blade, which is still beneath the member 33. The limit switch 212 for the saw arm activates the ram 210, which pulls the base 202 and saw arm 101 and blade in the same direction as the new moving end 216 but faster. When the saw blade is far enough in front of the moving end for a safe clearance, the air cylinder 204 raises the saw arm 101 to its uppermost position. The safe clearance can be detected as the furthest point of travel of the base 202 or the most retracted position of the piston 218 of the ram 210. Once the saw blade is above the moving member, which can be detected as the full extension of the air cylinder 204, the ram 210 pushes the base 202, with the saw arm 101 and saw blade, back to its initial position, perpendicular to the moving member, as in FIG. 13. An end stop 226 can provide precise positioning. The saw blade, the air cylinder and the ram are now in position to initiate the next cut, when the new end 216 engages the limit switch 206 on the end stop 208.

Figure 9:
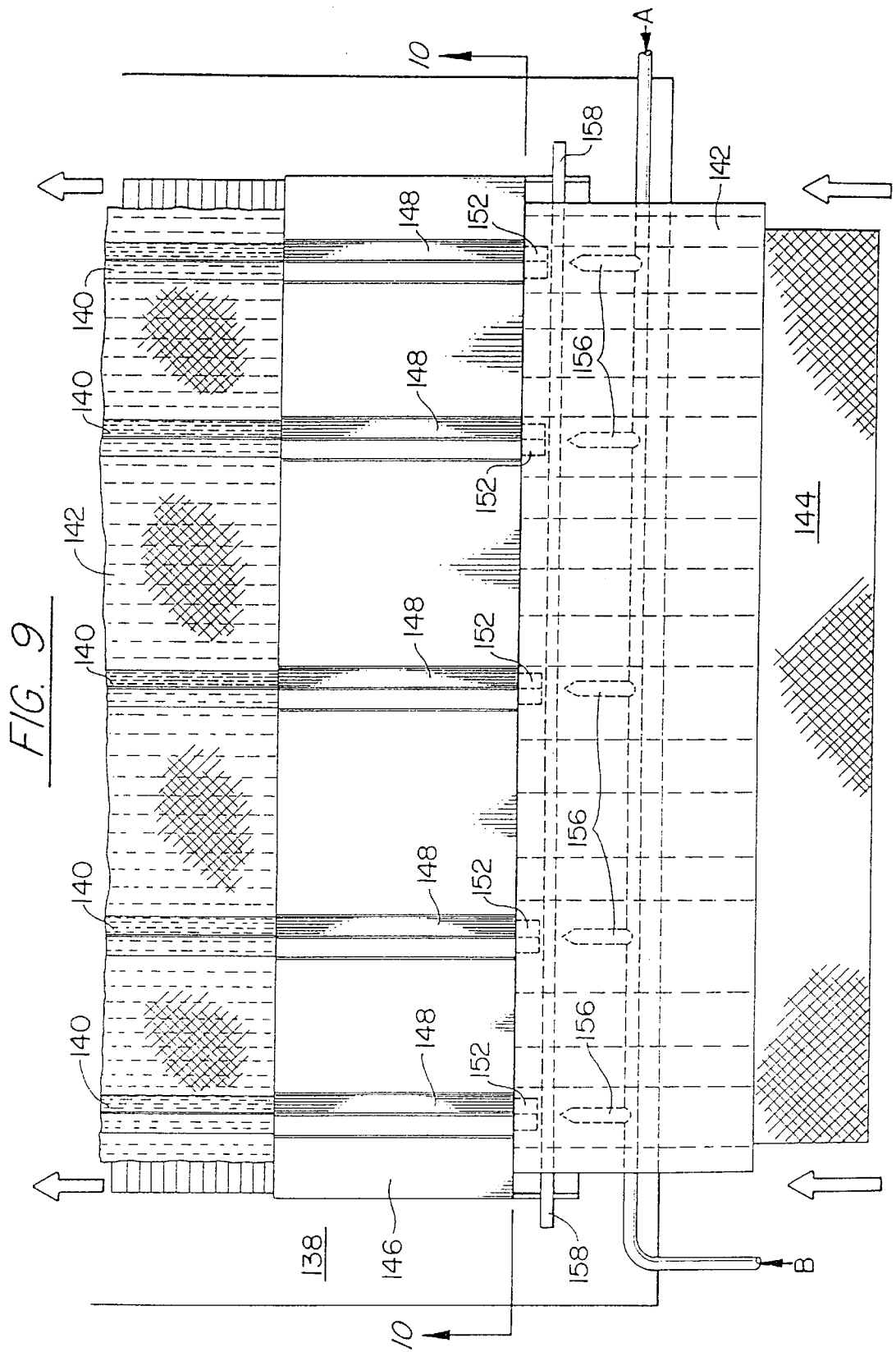
FIG. 9 is a top view of an alternative embodiment of the invention for manufacturing a plurality of spaced apart composite stringers, which are attached to one another by a fabric web.

In an alternative embodiment of the invention illustrated in FIGS. 9 and 10, an apparatus is shown for concurrently manufacturing multiple, spaced apart, composite structural members, for example beams or stringers as described above, in a process using a large sheet of fabric webbing such as a reinforcing fabric, non-woven fabric or attached fabric layers. As shown in FIGS. 9 and 10, multiple spaced apart members 140 are produced from webbing 142, 144 which may be comprised of narrower webs which are stitched side to side to form a wider width. In a preferred embodiment, web 142 is a layered fabric as described above, wherein a non-woven fabric has been attached to a reinforcing fabric layer as described in Lewit et al. Similarly, web 144 is preferably either a non-woven fabric or a layered fabric. Webs 142, 144 are preferably mounted for in manner similar to that shown in FIG. 4(A) for convenient dispensing. However, the invention is not limited in this regard and any suitable means can be provided for dispensing fabric webs 142, 144.

Webs 142 and 144 are drawn through compound die 146, by a plurality of conveyors 150. Conveyors 150 are preferably driven by electric motors, as is well known in the art. FIGS. 9 and 10 show an exemplary arrangement of conveyors, it being understood that any other conveyor arrangement may also be used, provided that the fabric webs 142, 144 are smoothly drawn through compound die 146, and along the conveying path.

Compound die 146 is preferably comprised of a series of profiled channels 148 defined therein for concurrently forming a plurality of members. As shown in FIG. 10, profiled channels 148 are roughly trapezoidal in cross-section. However, it should be understood that the invention is not limited in this regard and any desired profile, such as triangular or rectangular may be used for this purpose. Likewise, the profiled channels may be all of the same size and cross-sectional shape, or may be different sizes and cross-sectional shapes as required for a particular application. FIG. 10 shows a typical compound die configuration for a boat hull requiring a plurality of stringers adjacent to one another and decreasing in size away from a centerline.

Fabric guides 152 are provided for separating the upper and lower webs 142, 144 from one another to form a foam injection zone 154 for injection of foam via nozzles 156. Fabric guides 152 are preferably mounted to fabric guide support structure 158. The fabric guide support structure 158 is preferably independently mounted to base 138 to avoid any interference with the movement of webs 142, 144 along the conveying path. Nozzles 156 and the foam injection system are preferably as previously described above with respect to FIGS. 4–8, with the exception that multiple nozzles are provided for injecting foam into each of the injection zones 154. Likewise, any suitable cutting device can be provided for limiting the length of the multiple attached members produced at the output of compound die 146.

Figure 11:
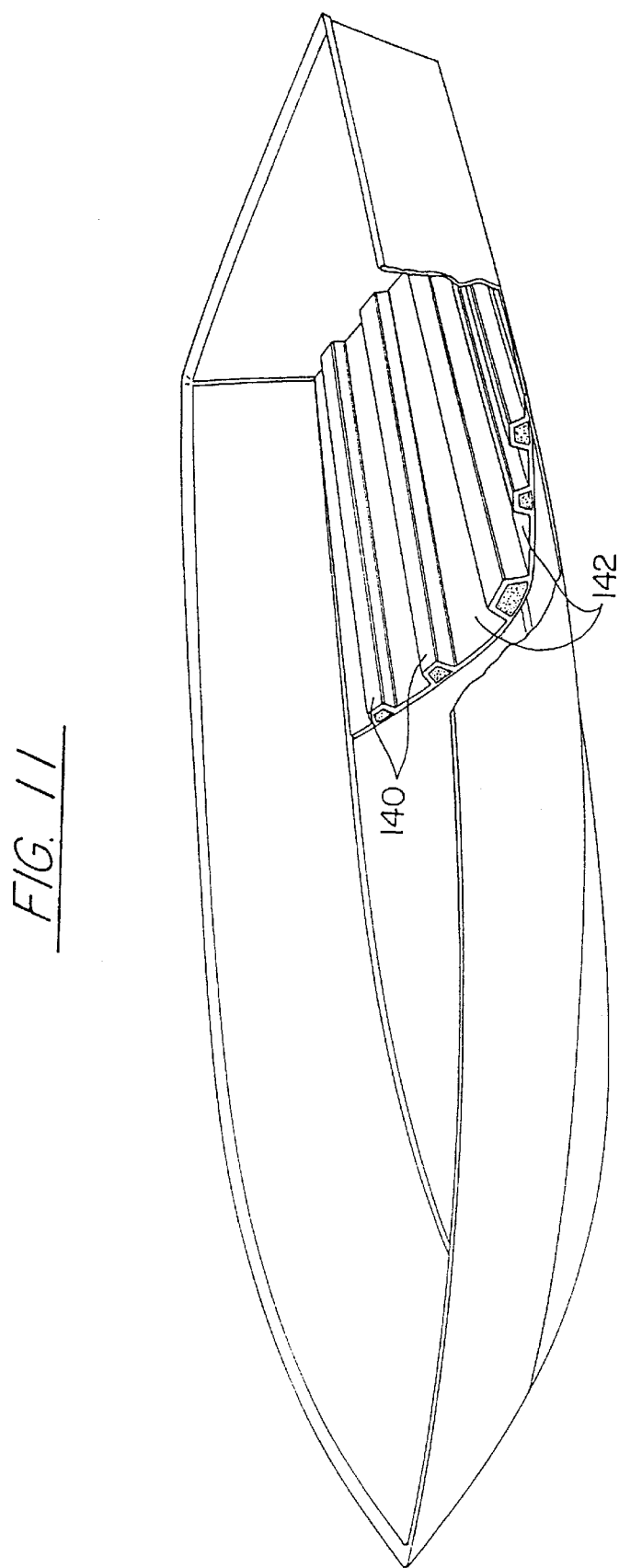
FIG. 11 is a perspective view of a plurality of spaced apart composite stringers manufactured in accordance with the invention, and installed in a boat hull under construction.

Multiple stringers spaced apart from one another and attached by fabric webs as described herein are considerably more efficient to install in a boat hull. As shown in FIG. 11, the attached stringers minimize the amount of labor required to position multiple stringers in a hull. The same is true for body parts for automobiles, trucks, trailers and the like. Instead, the entire assembly can be placed in a plastic hull and may thereafter be immediately wet out with resin for permanent installation therein. The use of multiple stringers spaced apart from one another and attached by fabric webs as shown in FIG. 11 can in many cases avoid the need for more complicated jigs to position the stringers while they are being laminated into place within the hull. Significantly, while FIG. 11 illustrates the use of the multiple attached stringer system in a boat application, it should be understood that the invention is not limited in this regard. Instead, such multiple attached stringer systems can be used in any composite structure application, including for example wall panels, automobile or truck body parts, door panels, ring beams for storage tanks and any other composite structure which requires that reinforcing beams or stringers be installed to provide added structural rigidity.

Although particular preferred embodiments of the invention have been disclosed in detail for illustrative purposes, it will be recognized that variations or modifications of the disclosed invention lie within the scope of the present invention.

What is claimed is:

1. An apparatus for manufacturing a composite structure having an exposed reinforcing fabric layer free of structural foam and curable resin, said apparatus comprising:
   a conveyor for conveying at least one fabric web along a conveying path, said at least one fabric web comprised of a layered fabric, said layered fabric having said reinforcing fabric layer and a non-woven fabric layer attached to one side thereof, having intestices into which structural foam is filled;
   an injection system for injecting a structural foam into a foam injection zone completely lined by said at least one fabric web, said non-woven fabric layer facing said interior of said foam injection zone;
   a die positioned along said conveying path, defining said injection zone and shaping said composite structure to a desired cross-sectional profile; and
   wherein said structural foam fills interstices of said non-woven fabric layer, thereby attaching said structural foam to said at least one fabnic web without allowing penetration of the structural foam into said reinforcing fabric layer, and wherein said reinforcing fabric layer remains free of structural foam and curable resin after said structural foam has cured.

2. The apparatus according to claim 1, further comprising means for rotatably supporting a roll of said at least one fabric web.

3. The apparatus according to claim 1, further comprising means for guiding said at least one fabric web to said conveyor and said conveying path.

4. The apparatus according to claim 1, further comprising a cutting device for cutting said foam core preform to a desired length.

5. The apparatus according to claim 4, wherein said cutting device is automatic.

6. The apparatus according to claim 1, further comprising a dynamic flow rate control system to vary the volumetric rate of flow of at least first and second foam constituent materials to achieve a precisely controlled predetermined instantaneous mass ratio of said constituent materials at a low rate of flow.

7. The apparatus according to claim 6, wherein said dynamic flow rate control system comprises:
   a flow sensor;
   a feedback loop;
   a gear pump; and,
   a braking unit operatively connected to said gear pump, said braking unit limiting the flow rate of said at least one foam constituent material maintained under pressure.

8. The apparatus according to claim 7, wherein said feedback loop comprises a computer for controlling said gear pump.

9. The apparatus according to claim 8, wherein said braking unit is selected from the group consisting of:
   a speed reducing electric motor;
   an electromechanical brake; and
   a hydraulic brake.

10. The apparatus according to claim 1, further comprising:
    a gear pump for controlling a rate of flow of one of said foam constituent materials; and
    a braking unit for speed-limiting said gear pump.

11. The apparatus according to claim 1, further comprising a dynamic flow rate control system to vary the volumetric rate of flow of at least one of said foam constituent materials to achieve a precisely controlled predetermined total mass of foam injection at a low rate of flow.

12. The apparatus according to claim 11, wherein said dynamic flow rate control system comprises:
    a volumetric flow sensor;
    a feedback loop; and
    a variable flow controller.

13. The apparatus according to claim 11, wherein the density of said foam constituent materials is maintained constant by regulating the temperature and pressure thereof.

14. The apparatus according to claim 12, wherein said feedback loop comprises a computer for controlling said variable flow controller.

15. The apparatus according to claim 11, said dynamic flow rate control system maintains a ratio of said at least two foam constituent materials within a tolerance of approximately 5% for all flow rates in the range of approximately 30 grams to 3 pounds per minute.

16. The apparatus according to claim 11, wherein said dynamic flow rate control system maintains a total foam output of said injection means within a tolerance of approximately 1.5 grams per minute.

17. An apparatus for manufacturing a composite structure using a structural foam comprised of two or more component parts, at least one of said parts is pre-mixed with a blowing agent and maintained under pressure, said apparatus comprising:
    a conveyor for conveying at least one fabric web along a conveying path; said at least on fabric web comprised of a layered fabric, said layered fabric having a reinforcing fabric layer and a non-woven fabric layer attached to one side thereof;
    a structural foam injection system for injecting said structural foam into a foam injection zone lined by said at least one fabric web, a rate of flow of said foam component part which has been pre-mixed with a blowing agent being controlled by a gear pump which has a speed which is reduced by a braking unit; and
    a die positioned along said conveying path, said die provided for defining said injection zone and shaping said composite structure to a desired cross-sectional profile, whereby said structural foam is attached to said fabric web by having filled interstices of said fabric web without allowing penetration of the structural foam into said reinforcing fabric layer.

18. The apparatus according to claim 17, wherein said braking unit is selected from one of the group comprised of a speed reducing electric motor, an electromechanical brake, or a hydraulic brake.

19. An apparatus for manufacturing a composite structure having an exposed reinforcing fabric layer free of structural foam and curable resin, comprised of a plurality of foam core stringer members, spaced apart from one another and attached by a fabric web, said apparatus comprising:

conveyors for conveying together first and second fabric webs along a conveying path, said first fabric web comprised of reinforcing fabric attached to a non-woven fabric on one side thereof, and said second fabric web comprised of a non-woven fabric;

a compound die positioned along said conveying path, said compound die comprised of a plurality of profiled channels spaced apart from one another, a fabric guide for separating said first and second fabric webs and for defining a plurality of foam injection zones, said non-woven fabric layer facing an interior of each of said foam injection zones; and a structural foam injection system for injecting a structural foam into each of said plurality of foam injection zones.

20. The apparatus according to claim 19, further comprising means for rotatably supporting rolls of at least one of said first and second fabric webs.

21. The apparatus according to claim 19, further comprising means for guiding at least one of said first and second fabric webs to at least one of said conveyors and said conveying path.

22. The apparatus according to claim 19, further comprising a dynamic flow rate control system to vary the volumetric rate of flow of at least first and second foam constituent materials to achieve a precisely controlled predetermined instantaneous mass ratio of said constituent materials at a low rate of flow.

23. The apparatus according to claim 21, wherein said dynamic flow rate control system comprises:

a flow sensor;

a feedback loop;

a gear pump; and a braking unit operatively connected to said gear pump, said braking unit limiting the flow rate of said at least one foam constituent material maintained under pressure.

24. The apparatus according to claim 23, wherein said feedback loop comprises a computer for controlling said gear pump.

25. The apparatus according to claim 24, wherein said braking unit is selected from the group consisting of a speed reducing electric motor, an electro-mechanical brake, and a hydraulic brake.

26. The apparatus according to claim 19, further comprising:

a gear pump for controlling a rate of flow of one of said foam constituent materials; and a braking unit for speed-limiting said gear pump.

27. The apparatus according to claim 19, further comprising a dynamic flow rate control system to vary the volumetric rate of flow of at least one foam constituent material to achieve a precisely controlled predetermined total mass of foam injection at a low rate of flow.

28. The apparatus according to claim 27, wherein said dynamic flow rate control system comprises:

a volumetric flow sensor;

a feedback loop; and a variable flow controller.

29. The apparatus according to claim 27, wherein the density of said foam constituent materials is maintained constant by regulating the temperature and pressure thereof.

30. The apparatus according to claim 28, wherein said feedback loop comprises a computer for controlling said variable flow controller.

31. The apparatus according to claim 27, said dynamic flow rate control system maintains a ratio of said at least two foam constituent materials within a tolerance of approximately 5% for all flow rates in the range of approximately 30 grams to 3 pounds per minute.

32. The apparatus according to claim 27, wherein said dynamic flow rate control system maintains a total foam output of said injection means within a tolerance of approximately 1.5 grams per minute.

* * * * *

UNITED STATES PATENT AND TRADEMARK OFFICE
CERTIFICATE OF CORRECTION

PATENT NO. : 6,206,669 B1
DATED : March 27, 2001
INVENTOR(S) : Lewit, Scott M., Mackaness, Miles It is certified that error appears in the above-identified patent and that said Letters Patent is hereby corrected as shown below:

Column 15,
Line 22, replace "intestices" with -- interstices --.
Line 33, replace "fabnic" with -- fabric --.

Column 16,
Line 4, replace "electromechanical" with -- electro-mechanical --.
Line 43, replace "on" with -- one --.

Signed and Sealed this

Eleventh Day of December, 2001

Attest:

NICHOLAS P. GODICI
*Attesting Officer*   *Acting Director of the United States Patent and Trademark Office*